United States Patent [19]
Uchida et al.

[11] Patent Number: 6,160,801
[45] Date of Patent: Dec. 12, 2000

[54] MOBILE COMMUNICATION SYSTEM

[75] Inventors: Yoshinori Uchida; Shinji Matsumoto, both of Tokyo, Japan

[73] Assignee: Mitsubishi Denki Kabushiki Kaisha, Tokyo, Japan

[21] Appl. No.: 08/998,732

[22] Filed: Dec. 29, 1997

[30]  Foreign Application Priority Data

Jul. 14, 1997 [JP] Japan ................................ 9-188356

[51] Int. Cl.[7] ............................................ H04J 3/00
[52] U.S. Cl. ........................................ 370/337; 370/335
[58] Field of Search ................................ 370/335, 336, 370/337, 344, 347, 342, 319, 320, 321, 441, 442, 324, 331, 343, 503; 455/436, 437, 439, 442

[56]  References Cited

U.S. PATENT DOCUMENTS

| | | | |
|---|---|---|---|
| 4,688,210 | 8/1987 | Eizenhöffer et al. ............... | 370/335 |
| 4,799,252 | 1/1989 | Eizenhöffer et al. ............... | 370/330 |
| 5,345,439 | 9/1994 | Marston ............................. | 370/320 |
| 5,373,502 | 12/1994 | Turban ............................. | 370/441 |
| 5,497,424 | 3/1996 | Vanderpool ........................ | 380/34 |
| 5,511,068 | 4/1996 | Sato .................................. | 370/335 |
| 5,533,023 | 7/1996 | Ohlson et al. .................... | 370/319 |
| 5,539,730 | 7/1996 | Dent ................................. | 370/280 |
| 5,614,914 | 3/1997 | Bolgiano et al. ................. | 342/364 |
| 5,640,385 | 6/1997 | Long et al. ....................... | 370/335 |
| 5,862,132 | 1/1999 | Blanchard et al. ................ | 370/342 |
| 5,894,473 | 4/1999 | Dent .................................. | 370/342 |
| 5,940,006 | 8/1999 | MacLellan et al. ............... | 340/825.54 |
| 6,009,089 | 12/1999 | Huang et al. ..................... | 370/342 |

OTHER PUBLICATIONS

H. Yoshino et al., "Adaptive Interference Canceller Based Upon RLS–MLSE", Journal of Electronics, Information and Communication Engineers of Japan, B–II, vol. J77–B–11, No. 2, pp. 74–84, Feb. 1994 (with translation).

*Primary Examiner*—Ajit Patel
*Assistant Examiner*—Brian Nguyen
*Attorney, Agent, or Firm*—Rothwell, Figg, Ernst & Manbeck

[57]  ABSTRACT

A mobile communication system implementing a frequency sharing and a time slot sharing using communication signal including a plurality of TDMA signals and/or the time divided CDMA signals, to supply the mobile communication system with an improved overall communication quality. The system includes the communication signal from a plurality of multiple access method for sharing frequency and time. A TDMA signal identified by synchronization word code has a different synchronization word code from each other, which is assigned to the same frequency and time slot. A time divided CDMA signal is frequency spreaded by spreading codes which is assigned to time divided time slot. The system also includes the stations which regenerate the time divided CDMA shared signal from the received communication signal and after a removal of the shared signal from the communication signal the TDMA signal synchronization word code is regenerated as desired signal.

18 Claims, 37 Drawing Sheets

Fig.8

| COMMUNICATION CHANNEL NO. | TIME SLOT NO. | FREQUENCY CHANNEL NO. | DATA RATE (bps) (AND RATE WITHIN TIME SLOT) | TRANSMISSION TYPE | CHIP RATE (bps) | INFORMATION TO IDENTIFY ACCESS TDMA : Sync W CDMA : CODE NO. |
|---|---|---|---|---|---|---|
| 1011 | 1 | 1 | 192k(1.536M) | TDMA | 0 | SyW1 |
| 1012 | 1 | 2 | 192k(1.536M) | TDMA | 0 | SyW1 |
| 1013 | 1 | 3 | 192k(1.536M) | TDMA | 0 | SyW1 |
| 1014 | 1 | 4 | 192k(1.536M) | TDMA | 0 | SyW1 |
| 1015(16A) | 1 | 5 | 192k(1.536M) | TDMA | 0 | SyW1 |
| 1016(16B) | 1 | 5 | 192k(1.536M) | TDMA | 0 | SyW2 |
| 1017 | 1 | 6 | 8k(64K) | CDMA | 40.96M | 64017 |
| 1018 | 1 | 6 | 8k(64K) | CDMA | 40.96M | 64018 |
| 1019 | 1 | 6 | 8k(64K) | CDMA | 40.96M | 64019 |

| COMMUNICATION CHANNEL NO. | TIME SLOT NO. | FREQUENCY CHANNEL NO. | TRANSMISSION TYPE | INFORMATION TO IDENTIFY ACCESS TDMA:Sync W CDMA:CODE NO. | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|
| 1011 | 1 | 1 | TDMA | SyW1 | BS1:1 | | | |
| 1012 | 1 | 2 | TDMA | SyW1 | BS1:2 | | | |
| 1013 | 1 | 3 | TDMA | SyW2 | BS2:0 | VACANT | | BS2:0 |
| 1014 | 1 | 4 | TDMA | SyW1 | BS1:1 | | | |
| 1015(16A) | 1 | 5 | TDMA | SyW1 | BS1:1 | MS1:3 | MS1:1 | BS1:3 |
| 1016(16B) | 1 | 5 | TDMA | SyW2 | BS1:(0.5) | – | MS1:1 | BS2:3 |
| 1017 | 1 | 6 | CDMA | 64017 | BS1:1 | 3 | | |
| 1018 | 1 | 6 | CDMA | 64018 | BS1:3 | 1 | | |
| 1019 | 1 | 6 | CDMA | 64019 | BS1:2 | 3 | | |

| COMMUNICATION CHANNEL NO. | TIME SLOT NO. | FREQUENCY CHANNEL NO. | TRANSMISSION TYPE | INFORMATION TO IDENTIFY ACCESS TDMA : Sync W CDMA : CODE NO. | BS NO.: ELECTRIC FIELD STRENGTH FOR RECEIVING | SHARED SIGNAL CANCELER NO. | DESIRED SIGNAL RECEIVER NO. |
|---|---|---|---|---|---|---|---|
| 1014 | 1 | 4 | TDMA | SyW1 | BS1:3 | TDMA1C | |
| 1015(16A) | 1 | 5 | TDMA | SyW1 | BS1:1 | | TDMA16A |
| 1016(16B) | 1 | 5 | TDMA | SyW2 | BS1:(0.5) | - | TDMA16B |
| 1017 | 1 | 6 | CDMA | 64017 | BS1:1 | | CDMA17 |
| 1018 | 1 | 6 | CDMA | 64018 | BS1:3 | CDMA1C | |
| 1019 | 1 | 6 | CDMA | 64019 | BS1:3 | CDMA2C | |
| 1020 | 1 | 7 | FDMA | | BS1:3 | FDMA1C | |
| REST IS OMITTED | | | | | | | |

| COMMUNICATION CHANNEL NO. | TIME SLOT NO. | FREQUENCY CHANNEL NO. | TRANSMISSION TYPE | DATA RATE (bps) (AND RATE WITHIN TIME SLOT) | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|
| 1011 | 1 | 1 | TDMA | SyW1 | BS1:1 | | | |
| 1012 | 1 | 2 | TDMA | SyW1 | BS1:2 | | | |
| 1013 | 1 | 3 | TDMA | SyW2 | BS2:0 | VACANT | VACANT | BS2:0 |
| 1014 | 1 | 4 | TDMA | SyW1 | BS1:1 | MS1:3 | MS1:1 | BS1:3 |
| 1015(16A) | 1 | 5 | TDMA | SyW1 | BS1:1 BS2:1 BS3:0.7 BS4:0 BS5:0 BS6:0 BS7:0.4 | | | |
| 1016(16B) | 1 | 5 | TDMA | SyW2 | BS1:(0.5) | VACANT | MS1:1 | BS2:3 |
| 1017 | 1 | 6 | CDMA | 64017 | BS1:1 | 3 | | |
| 1018 | 1 | 6 | CDMA | 64018 | BS1:3 | 1 | | |
| 1019 | 1 | 6 | CDMA | 64019 | BS1:2 | 3 | | |

| COMMUNICATION CHANNEL NO. | TIME SLOT NO. | FREQUENCY CHANNEL NO. | TRANSMISSION TYPE | INFORMATION TO IDENTIFY ACCESS TDMA : Sync W CDMA : CODE NO. | BS NO.: ELECTRIC FIELD STRENGTH FOR RECEIVING | SHARED SIGNAL CANCELER NO. | DESIRED SIGNAL RECEIVER NO. |
|---|---|---|---|---|---|---|---|
| 1013 | 1 | 3 | TDMA | SyW2 | BS2:0 | VACANT | VACANT |
| 1015(16A) | 1 | 5 | TDMA | SyW1 | BS2:(0.3) | | TDMA16A |
| 1016(16B) | 1 | 5 | TDMA | SyW2 | BS2:0 | VACANT | VACANT |
| 1017 | 1 | 6 | CDMA | 64017 | BS2:1 | | CDMA17 |
| 1018 | 1 | 6 | CDMA | 64018 | BS2:3 | CDMA1C | |
| 1019 | 1 | 6 | CDMA | 64019 | BS2:3 | CDMA2C | |

Fig.25

| COMMUNICATION CHANNEL NO. | TIME SLOT NO. | FREQUENCY CHANNEL NO. | TRANSMISSION TYPE | INFORMATION TO IDENTIFY ACCESS TDMA : Sync W CDMA : CODE NO. | BS NO.: ELECTRIC FIELD STRENGTH FOR RECEIVING | SHARED SIGNAL CANCELER NO. | DESIRED SIGNAL RECEIVER NO. |
|---|---|---|---|---|---|---|---|
| 1013 | 1 | 3 | TDMA | SyW2 | BS2:2 | TDMA13 | |
| 1015(16A) | 1 | 5 | TDMA | SyW1 | BS2:(0.3) | | TDMA16A |
| 1016(16B) | 1 | 5 | TDMA | SyW2 | BS2:0 | VACANT | VACANT |
| 1017 | 1 | 6 | CDMA | 64017 | BS1:1 | | CDMA17 |
| 1018 | 1 | 6 | CDMA | 64018 | BS1:3 | CDMA1C | |
| 1019 | 1 | 6 | CDMA | 64019 | BS1:3 | CDMA2C | |
| REST IS OMITTED | | | | | | | |

Fig.27

| COMMUNICATION CHANNEL NO. | TIME SLOT NO. | FREQUENCY CHANNEL NO. | TRANSMISSION TYPE | DATA RATE (bps) (AND RATE WITHIN TIME SLOT) | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|
| 1013 | 1 | 3 | TDMA | SyW1 | BS2:2 | MS2:2 | MS2:2 | MS2:2 |
| 1015(16A) | 1 | 5 | TDMA | SyW1 | BS2:(0.3) | MS1:0 | MS1:1 | BS1:3 |
| 1016(16B) | 1 | 5 | TDMA | SyW2 | BS2:1 | MS1:3 | MS1:1 | BS2:3 |
| 1017 | 1 | 6 | CDMA | 64017 | BS2:1 | 3 | | |
| 1018 | 1 | 6 | CDMA | 64018 | BS2:3 | 1 | | |
| 1019 | 1 | 6 | CDMA | 64019 | BS2:2 | 3 | | |

Fig.33

| COMMUNICATION CHANNEL NO. | MS POSITION ZONE NO. | TIME SLOT NO. | FREQUENCY CHANNEL NO. | TRANSMISSION TYPE | INFORMATION TO IDENTIFY ACCESS TDMA : SyncW CDMA : CODE NO. | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|---|
| 1015(16A) |   | 1 | 5 | TDMA | SyW1 | BS1:1 | MS1:3 | MS1:1 | BS1:3 |
| 1016(16B) |   | 1 | 5 | TDMA | SyW2 | BS1:(0.5) | - | MS1:1 | BS2:3 |
| 1017 |   | 1 | 6 | CDMA | 64017 | BS1:1 | MS7:3 |   |   |
| 1018 |   | 1 | 6 | CDMA | 64018 | BS1:3 | MS8:1 |   |   |
| 1019 |   | 1 | 6 | CDMA | 64019 | BS1:2 | MS9:3 |   |   |
| 1021 | 11 | 1 | 3 | CDMA | 64021 | BS1:1 | MS21:1 | MS21:1 | BS1:1 |
| 1022 | 12 | 2 | 3 | CDMA | 64022 | BS1:1 | MS22:2 | MS22:1 | BS1:2 |
| 1023 | 12 | 2 | 3 | CDMA | 64023 | BS1:1 | MS23:2 | MS23:1 | BS1:2 |
| 1024 | 12 | 2 | 3 | CDMA | 64024 | BS1:1 | MS24:2 | MS24:1 | BS1:2 |
| 1025 | 13 | 3 | 3 | CDMA | 64025 | BS1:1 | MS25:3 | MS25:1 | BS1:3 |
| 1026 | 13 | 3 | 3 | CDMA | 64026 | BS1:1 | MS26:3 | MS26:1 | BS1:3 |
| 1027 | 13 | 3 | 3 | CDMA | 64027 | BS1:1 | MS27:3 | MS27:1 | BS1:3 |

Fig.34

| COMMUNICATION CHANNEL NO. | MS POSITION ZONE NO. | TIME SLOT NO. | FREQUENCY CHANNEL NO. | TRANSMISSION TYPE | INFORMATION TO IDENTIFY ACCESS TDMA : Sync W CDMA : CODE NO. | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|---|
| 1021 | 11 | 1 | 3 | CDMA | 64021 | BS1:1 | MS21:1 | MS21:1 | BS1:1 |
| 1022 | 12 | 2 | 3 | CDMA | 64022 | BS1:1 | MS22:2 | MS22:1 | BS1:2 |
| 1023 | 12 | 2 | 3 | CDMA | 64023 | BS1:1 | MS23:2 | MS23:1 | BS1:2 |
| 1024 | 12 | 2 | 3 | CDMA | 64024 | BS1:1 | MS24:2 | MS24:1 | BS1:2 |
| 1025 | 13 | 3 | 3 | CDMA | 64025 | BS1:1 | MS25:3 | MS25:1 | BS1:3 |
| 1026 | 13 | 3 | 3 | CDMA | 64026 | BS1:1 | MS26:3 | MS26:1 | BS1:3 |
| 1027 | 13 | 4 | 3 | CDMA | 64027 | BS1:1 | MS27:3 | MS27:1 | BS1:3 |

Fig.38

| COMMUNICATION CHANNEL NO. | MS POSITION ZONE NO. | TIME SLOT NO. | FREQUENCY CHANNEL NO. | TRANSMISSION TYPE | INFORMATION TO IDENTIFY ACCESS TDMA : Sync W CDMA : CODE NO. | BS NO.: ELECTRIC FIELD STRENGTH FOR RECEIVING | MS NO.: TRANSMITTING POWER | MS NO.: ELECTRIC FIELD STRENGTH FOR RECEIVING | BS NO.: TRANSMITTING POWER |
|---|---|---|---|---|---|---|---|---|---|
| 1031 | | 1 | 4 | TDMA | SyW1 | BS1:1 | MS31:1 | MS31:1 | BS1:1 |
| 1032 | | 1 | 4 | TDMA | SyW2 | BS2:0 | MS31:0 | MS31:0.3 | BS2:3 |
| 1017 | | 1 | 6 | CDMA | 64017 | BS1:1 | MS7:3 | | |
| 1018 | | 1 | 6 | CDMA | 64018 | BS1:3 | MS8:1 | | |
| 1019 | | 1 | 6 | CDMA | 64019 | BS1:2 | MS9:3 | | |
| 1021 | 11 | 1 | 3 | CDMA | 64021 | BS1:1 | MS21:1 | MS21:1 | BS1:1 |
| 1033 | 12 | 2 | 4 | TDMA | SyW1 | BS1:1 | MS33:2 | MS33:1 | BS1:2 |
| 1034 | 12 | 2 | 5 | TDMA | SyW1 | BS1:1 | MS34:2 | MS34:1 | BS1:2 |
| 1022 | 12 | 2 | 3 | CDMA | 64022 | BS1:1 | MS22:2 | MS22:1 | BS1:2 |
| 1023 | 12 | 2 | 3 | CDMA | 64023 | BS1:1 | MS23:2 | MS23:1 | BS1:2 |
| 1024 | 12 | 2 | 3 | CDMA | 64024 | BS1:1 | MS24:2 | MS24:1 | BS1:2 |
| 1035 | 13 | 3 | 4 | TDMA | SyW1 | BS1:1 | MS35:3 | MS35:1 | BS1:3 |
| 1036 | 13 | 3 | 5 | TDMA | SyW1 | BS1:1 | MS36:3 | MS36:1 | BS1:3 |
| 1025 | 12 | 3 | 3 | CDMA | 64025 | BS1:1 | MS25:3 | MS25:1 | BS1:3 |
| 1026 | 13 | 3 | 3 | CDMA | 64026 | BS1:1 | MS16:3 | MS16:1 | BS1:3 |
| 1027 | 13 | 3 | 3 | CDMA | 64027 | BS1:1 | MS17:3 | MS17:1 | BS1:3 |
| 1037 | 13 | 4 | 4 | TDMA | SyW1 | BS1:1 | MS37:3 | MS37:1 | BS1:3 |

MOBILE COMMUNICATION SYSTEM

BACKGROUND OF THE INVENTION

1. Field of the invention

The invention is about a mobile communication system that uses the followings: a frequency division multiple access method (FDMA), a time division multiple access method (TDMA), and a code division multiple access method (CDMA) or time divided code division multiple access method (time divided CDMA). The invention is related to a mobile communication system which provides the implementations of a radio frequency spectrum sharing (hereinafter frequency sharing) and a time slot sharing within a frame (hereinafter time slot sharing).

2. Description of the related art

The mobile communication system, for example, includes a plurality of mobile stations and at least a base station. Examples of the mobile station includes an automobile communication equipment and a portable communication terminal. The base station communicates with the mobile station through a radio channel. An advancement in the future of mobile communication system is highly expected particularly for the frequency sharing and the time slot sharing of the FDMA, TDMA and CDMA methods, from the viewpoint of channel efficiency.

The frequency sharing by a different spreading codes has already been implemented in the CDMA method.

The following methods in mobile communication system are filed by us as patent applications: a time slot sharing by TDMA signals and time divided CDMA signals within the same time slot; and a frequency sharing and time slot sharing by TDMA signals and time divided CDMA signals within the same time slot. (U.S. Ser. No. 08/524974 Filed:Sep. 8,1995; PCT/JP96/03507, Filed:Nov. 29, 1996; PCT/JP97/01113 Filed:Mar. 31, 1997).

With regard to a system of sharing a plurality of CDMA signals, for example, is disclosed in U.S. Pat. No. 5,363,403 "Speed Spectrum CDMA Subtractive Interference Canceler and Method" (IDC, by D. L. Schilling et al., Filed: Apr. 22 1993). However, the patent specification does not disclose a system to handle time divided CDMA method.

With regard to an adaptive filter of the time divided CDMA method, for example, is disclosed in U.S. Pat. No. 5,511,068 "Mobile Communication System capable of Transmitting and Receiving a Radio Signal obtained by TDMA and CDMA without Interference" (NEC, by T. Sato, Filed: Dec. 6, 1994). However, the patent specification does not disclose the frequency sharing of CDMA signal and TDMA signal within a same time slot.

The problem with the conventional mobile communication system is that it does not mention an effective method for a channel sharing the various access methods. That is, it does not mention about a method of the frequency sharing and the time slot sharing by a plurality of TDMA signals, nor about a method of the time slot sharing by the time divided CDMA signals. In addition, for communication between the mobile station and base station, an effective method to assign the TDMA signals and time divided CDMA signals in each communication from the viewpoint of the communication quality of the whole system is not indicated.

SUMMARY OF THE INVENTION

The invention attempts to solve the problems mentioned above, aiming to supply a mobile communication system implementing the frequency sharing and the time slot sharing of the plurality of TDMA signals or the time divided CDMA signals. Further, for such frequency sharing and time slot sharing, the invention is aiming to supply a mobile communication system with improved communication quality of the whole system.

According to one aspect of the present invention, a mobile communication system for radio communication comprises stations including a plurality of mobile stations and at least a base station, wherein the mobile communication is performed between the stations with a communication signal using a determined method from a plurality of multiple access methods in sharing one of frequency and time. The stations include a receiving unit for receiving a communication signal including: a TDMA signal identified by synchronization word code having a different synchronization word code from each other, and assigned to the same frequency and time slot, based on TDMA method; and a time divided CDMA signal, frequency spreaded by a spread code and is assigned to time division time slot, based on CDMA method. The stations also include: a shared signal regeneration unit for regenerating the time divided CDMA signal from the received communication signal and for outputting a shared signal; a shared signal removing unit for removing the shared signal from the communication signal; and a desired signal regeneration unit for regenerating the TDMA signal identified by synchronization word code after removal of the shared signal from the communication signal and for outputting a desired signal.

According to an another aspect of the invention, a mobile communication system for radio communication comprises stations including a plurality of mobile stations and at least a base station, wherein the mobile communication is performed between the stations with a communication signal using a determined method from a plurality of multiple access methods in sharing one of frequency and time. The stations include a receiving unit for receiving a communication signal including: a TDMA signal identified by synchronization word code having a different synchronization word code from each other, and assigned to the same frequency and time slot, based on TDMA method; and a time divided CDMA signal, frequency spreaded by a spread code and is assigned to time division time slot, based on CDMA method. The stations also include: a shared signal regeneration unit for regenerating the TDMA signal identified by synchronization word code from the received communication signal and for outputting a shared signal; a shared signal removing unit for removing the shared signal from the communication signal; and a desired signal regeneration unit for regenerating the time divided CDMA signal after removal of the shared signal from the communication signal and for outputting a desired signal.

According to an another aspect of the present invention, a mobile communication system for radio communication comprises stations including a plurality of mobile stations and at least a base station, wherein the mobile communication is performed between stations with a communication signal using a determined method from a plurality of multiple access methods in sharing one of frequency and time. The stations include a receiving unit for receiving a communication signal including: a TDMA signal identified by synchronization word code having a different synchronization word code from each other, and assigned to the same frequency and time slot, based on TDMA method; and a time divided CDMA signal, frequency spreaded by a spread code and is assigned to time division time slot, based on CDMA method. The stations also include: a base station control data memory unit for storing information for identifying access method as control data showing spreading code used in creating the time divided CDMA signal and synchronization word code used in the TDMA signal identified by synchronization word code, for the communication signal used within the service area of the base station; and a base station access method control unit for controlling multiple access methods between a plurality of mobile stations and a base station within the service area of the base station, based on the control data.

A mobile communication system for radio communication comprises stations including a plurality of mobile stations and at least a base station, wherein the mobile communication is performed between stations with a communication signal using a determined method from a plurality of multiple access methods in sharing one of frequency and time. The stations include: a receiving unit for receiving a communication signal including: a TDMA signal identified by synchronization word code having a different synchronization word codes from each other, and assigned to the same frequency and time slot, based on TDMA method; and a time divided CDMA signal, frequency spreaded by a spread code and is assigned to time division time slot, based on CDMA method. The stations also include a mobile switching center, connected to the base station, for controlling the multiple access methods used in the mobile communication system. The mobile switching center includes: a system control data memory unit for storing information for access method as control data showing spreading code used in creating the time divided CDMA signal and synchronization word code used in the TDMA signal identified by synchronization word code, for the communication signal used within the mobile communication system; and a system access method control unit for controlling multiple access methods between a plurality of mobile stations and at least a base station within the mobile communication system, based on the control data.

The base station access method control unit and the system access method control unit stores control data for each access method identified by information for identifying access method showing spreading code and synchronization word code. The control data has information on transmitting/receiving powers related to transmitting power at base station, receiving power at base station, transmitting power at mobile station and receiving power at mobile station. The base station has a plurality of shared signal regeneration units and a plurality of desired signal regeneration units corresponding to multiple access methods.

The station stores a control data for each access method identified by method using information for identifying access method showing spreading code and synchronization word code, and wherein the control data includes operation information of each of the shared signal regeneration units and each of the desired signal regeneration unit.

The one of the shared signal regeneration unit and the desired signal regeneration unit corresponding to the multiple access method is assigned to the communication signal depending on receiving power of the communication signal transmitted from the mobile station and received at the base station.

The system decides a handoff of the mobile station depending on a receiving power of a communication signal transmitted from a mobile station and received at a base station and a transmitting power of a communication signal transmitted from the base station to the mobile station. Based on the decision, adjoining base stations from the base station receive communication signal from the mobile station and the system decides a handoff destination of the base station based on the receiving powers at the adjoining base stations.

The one of the shared signal regeneration unit and the desired signal regeneration unit corresponding to the multiple access method is assigned to the communication signal depending on receiving power of the TDMA signal and the time divided CDMA signals at the handoff destination base station in case of making handoff to TDMA signal sharing frequency and time slot with time divided CDMA signal.

A mobile communication system for radio communication comprises stations including a plurality of mobile stations and at least a base station, wherein the mobile communication is performed between stations with a communication signal using a determined method from a plurality of multiple access methods in sharing one of frequency and time. The stations includes a receiving unit for receiving a communication signal including a TDMA signal identified by synchronization word code having a different synchronization word code from each other, and assigned to the same frequency and time slot, based on TDMA method. The mobile station performs communication with the base station using the TDMA signal identified by synchronization word code, and performs communication with the adjoining base stations using TDMA signal identified by synchronization word code that has a different synchronization word code from the previously used TDMA signal identified by synchronization word code upon handoff.

According to an another aspect of the present invention, a mobile communication system for radio communication comprises stations including a plurality of mobile stations and at least a base station, wherein the mobile communication is performed between stations with a communication signal using a determined method from a plurality of multiple access methods in sharing one of frequency and time. The station includes a receiving unit for receiving a communication signal including: a TDMA signal identified by synchronization word code having a different synchronization word code from each other, and assigned to the same frequency and time slot, based on TDMA method; and a time divided CDMA signal, frequency spreaded by a spread code and is assigned to time division time slot, based on CDMA method. Within the base station divides a radio coverage into a concentric zones centering the base station, wherein the concentric zones are corresponding to time slot of one of: TDMA signal, TDMA signal identified by synchronization word code, and time divided CDMA signal.

In a case when a mobile station is situated inside the concentric zones of radio coverage, which is assigned with time divided communication signal having time slot corresponding to the concentric zone, and moves to an another concentric zone, the mobile station is to be assigned with a time divided communication signal having time slot corresponding to a new concentric zone.

In a case when a mobile station is situated at an outermost of the concentric zone, the mobile station performs handoff to time divided communication signal having time slot corresponding to the outermost concentric zone of radio coverage by an adjoining base station.

In a case that a mobile station transmits a communication signal at a maximum transmitting power and a base station receives the communication signal at a minimum receiving intensity based on a pre-determined threshold value, the mobile station is determined to be situated at the outermost concentric zone of radio coverage by base station.

In a case when a number of mobile stations, situated inside the concentric zones of radio coverage, each of which is assigned with time divided communication signal having time slot corresponding to the concentric zone, has exceeded the pre-determined value, the mobile station is assigned with a time divided communication signal having a new time slot is assigned according to the new time slot that does not correspond to the previous time slot.

The mobile station situated inside the concentric zones of radio coverage, which is assigned with time divided communication signal having time slot corresponding to the concentric zone, adjusts a transmitting power of the mobile station to be able to receive the communication signal at base station within the level of receiving power based on a pre-determined minimum receiving intensity. The base station adjusts transmitting power at the base station to receive the communication signal at mobile station within the level of receiving power based on a pre-determined minimum receiving intensity.

According to an another aspect of the present invention, a mobile communication method for radio communication having stations including a plurality of mobile stations and at least a base station, wherein the mobile communication is performed between the stations with a communication signal using a determined method from a plurality of multiple access methods in sharing one of frequency and time. The method comprising steps of receiving a communication signal including: a TDMA signal identified by synchronization word code having a different synchronization word code from each other, and assigned to the same frequency and time slot, based on TDMA method; and a time divided CDMA signal, frequency spreaded by a spread code and is assigned to time division time slot, based on CDMA method. The method also comprises further steps of: regenerating one of the time divided CDMA signal and the TDMA signal identified by synchronization word code from the received communication signal as a shared signal and for outputting the shared signal; removing the shared signal from the communication signal; and regenerating one of the TDMA signal identified by synchronization word code and the time divided CDMA signal as a desired signal after removal of the shared signal from the communication signal and for outputting the desired signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 8 is a control table explaining the communication method parameters for the embodiment 2;

FIG. 10 is a control table explaining the transmitting/receiving power information for the embodiment 3;

FIG. 13 is a control table explaining the operational information of shared signal canceler and desired signal receiver for the embodiment 3;

FIG. 17 is a control table explaining information on receiving power for deciding handoff for the embodiment 3;

FIG. 20 is a control table explaining the operational information of shared signal canceler and desired signal receiver for the embodiment 4;

FIG. 25 is a control table explaining the operational information of shared signal canceler and desired signal receiver for the embodiment 5;

FIG. 27 is a control table explaining the operational information of shared signal canceler and desired signal receiver for the embodiment 5;

FIG. 33 is a control table of radio method parameters for the embodiment 6;

FIG. 34 is a control table of radio method parameters for the embodiment 6;

FIG. 38 is a detailed chart explaining a relationship between the frequency spectrum and the time slot of communication signal for the embodiment 7.

DETAILED DESCRIPTION OF THE PREFERRED EMBODIMENTS

Figure 1:
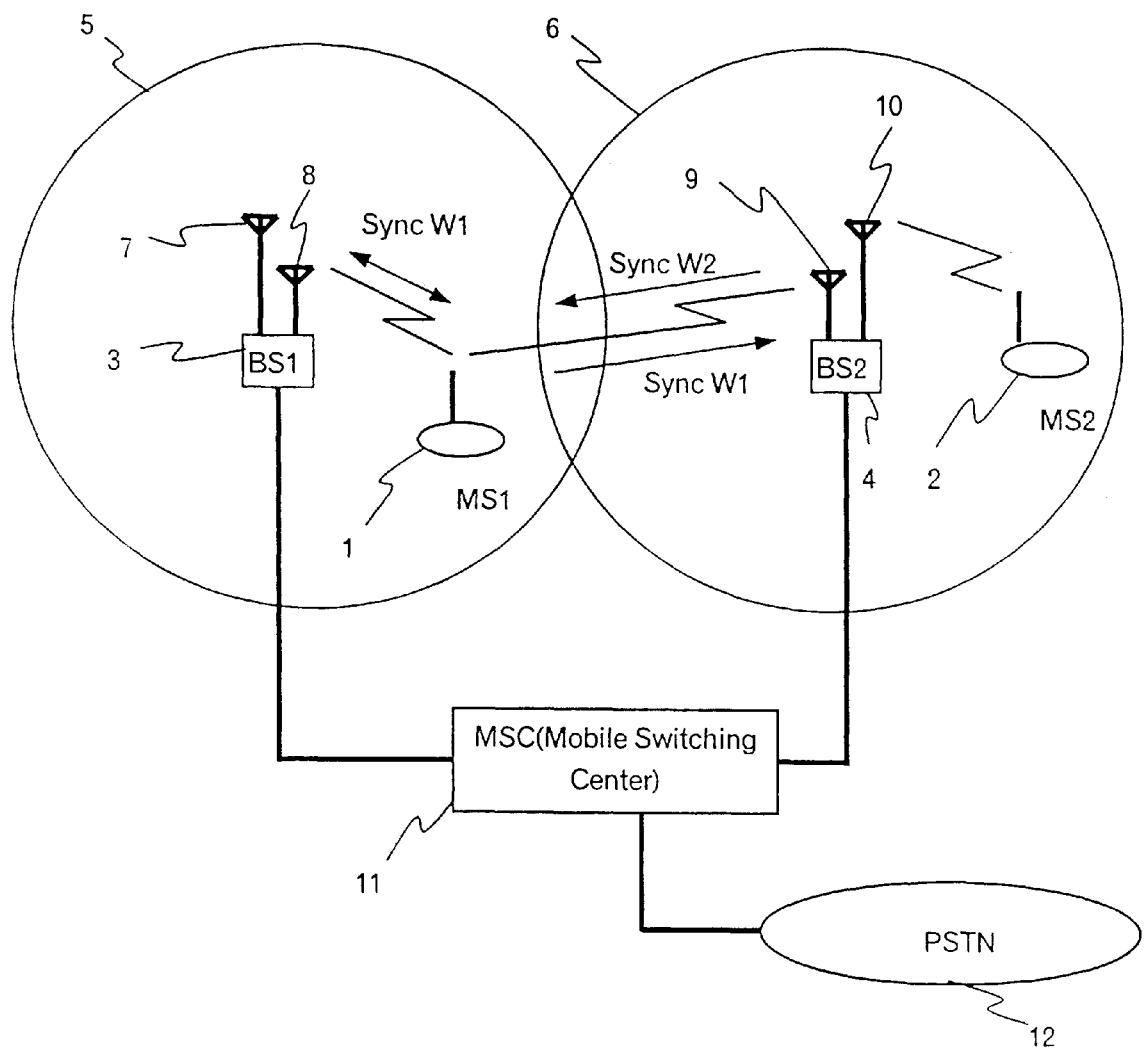
FIG. 1 is a mobile communication system block chart for the embodiment 1.

Reference will now be made in detail to the present preferred embodiments of the invention, examples of which are illustrated in the accompanying drawings, wherein like reference numerals indicate like elements throughout the several views.

Embodiments of the invention

Embodiment 1.

The mobile communication system of embodiment 1 according to this invention is described below.

Figure 2:
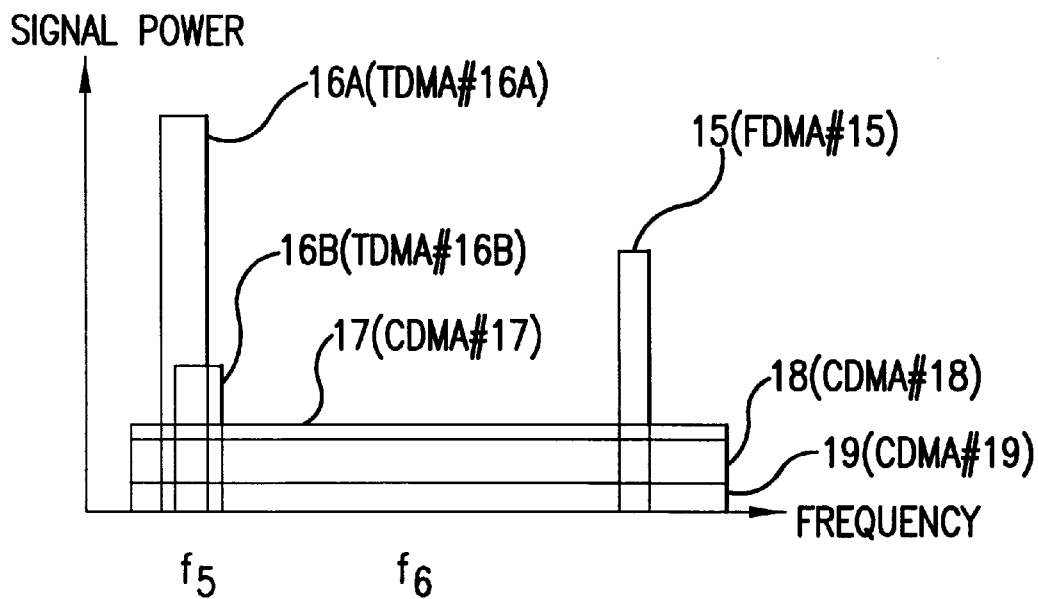
FIG. 2 is a frequency spectrum of the frequency sharing communication signal received at base station for the embodiment 1.

FIG. 1 is a block chart on the implemented system for time slot sharing and frequency sharing in the mobile communication system for embodiment 1. Following is the description of numbered components indicated in the FIGS. 1 and 2 are mobile stations (MS) such as the automobile and cellular communications equipment. 3 and 4 are base stations (BS) that communicates with the mobile station 1 (MS1) and the mobile station 2 (MS2) through radio channels. 5 and 6 are radio coverage (hereinafter cells) comprising of the base station 3 (BS1) and the base station 4 (BS2). 7 and 8 are diversity antennas of the base station 3 (BS1) and 9 and 10 are diversity antennas of the base station 4 (BS2). 11 is a mobile switching center (MSC) controlling various communications at the base station 3 (BS1) and the base station 4 (BS2). The mobile switching center 11 is connected to a public switching telephone network 12 (PSTN). Sync W1 and Sync W2 in the figure are synchronization word codes used as communication signals in the TDMA system, which will be described later.

As a modulation method from the mobile station 1 (MS1) and the mobile station 2 (MS2) to the base station 3 (BS1) and the base station 4 (BS2), following are the examples on digital modulation methods being used: frequency shifting keying (FSK); binary phase shifting keying (BPSK); quadrature phase shift keying (QPSK); quadrature differential phase shift keying (QPSK); π/4-quadrature differential phase shift keying (π/4-QDPSK); quadrature amplitude minimum shift keying (QAMSK); and quadrature gaussian minimum shift keying (QGMSK).

As a multiple access method, following methods are being used: FDMA, TDMA, CDMA and time divided CDMA.

Following bi-directional communication methods are being used: a frequency division duplex (FDD) method that divides frequency of transmitter and receiver signals; and time division duplex (TDD) method that divides time of transmitter and receiver signals.

FIG. 2 explains on a frequency spectrum of the frequency sharing of a communication signal received at base station for the embodiment 1. In FIG. 2, the horizontal axis is the frequency and the vertical axis is a signal power corresponding to a level of receiving power at the base station. The TDMA signals #16A and #16B appear to be displaced on the frequency axis, however, it should be noted that both #16A and #16B are on a same frequency channel. On this chart, FDMA signal #15 and the two TDMA signals #16A and #16B are sharing a part of the frequency spectrum with time CDMA signals #17, #18 and #19 (meaning of "time division" will be described later). Particularly, as will be mentioned later, TDMA signals #16A and #16B are on the same time slot and on the same frequency channel. The two TDMA signals #16A and #16B are TDMA signals for frequency sharing and time slot sharing. A detailed arrangement for each signal of frequency/time is illustrated on the first time slot of FIG. 4.

Figure 3:
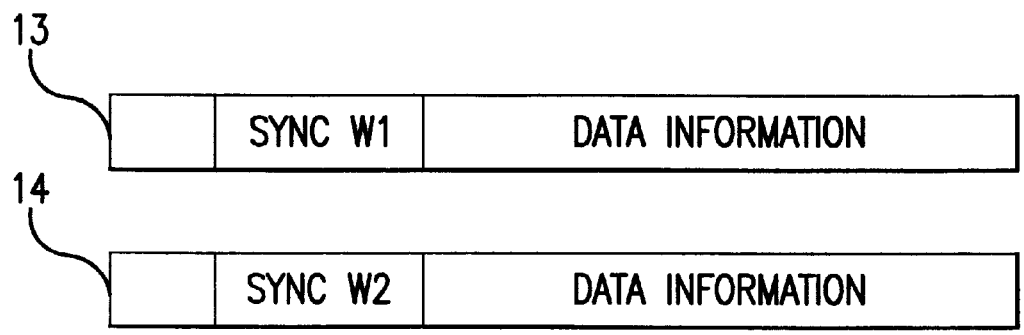
FIG. 3 is illustrating a structure of TDMA signal identified by synchronization word code for the embodiment 1.

FIG. 3 is a configuration for time slot of TDMA signal for previously described time slot sharing and the frequency sharing. As this figure is showing, the synchronization word codes for the two TDMA signals 13 and 14 are different, and the difference allows for it to act as a signal identifier from each other (hereinafter TDMA signal for time slot sharing and frequency sharing is referred to as "TDMA signal identified by synchronization word codes").

For such TDMA signal identified by synchronization word codes, "a system to use the same frequency channel and same time slot simultaneously by a plurality of users" is mentioned in a paper by Jin Yoshino et al., entitled "Performance of Interference Canceling Equalizer (ICE) for Mobile Radio Communication", Institute of Electronics, Information and Communication Engineers of Japan, 1996 Communication Society Conference Paper B-412. The paper only deals with a system for TDMA signal only. In the embodiment 1, a system deals not only with the TDMA signal but also the time divided CDMA signal as well.

Figure 4:
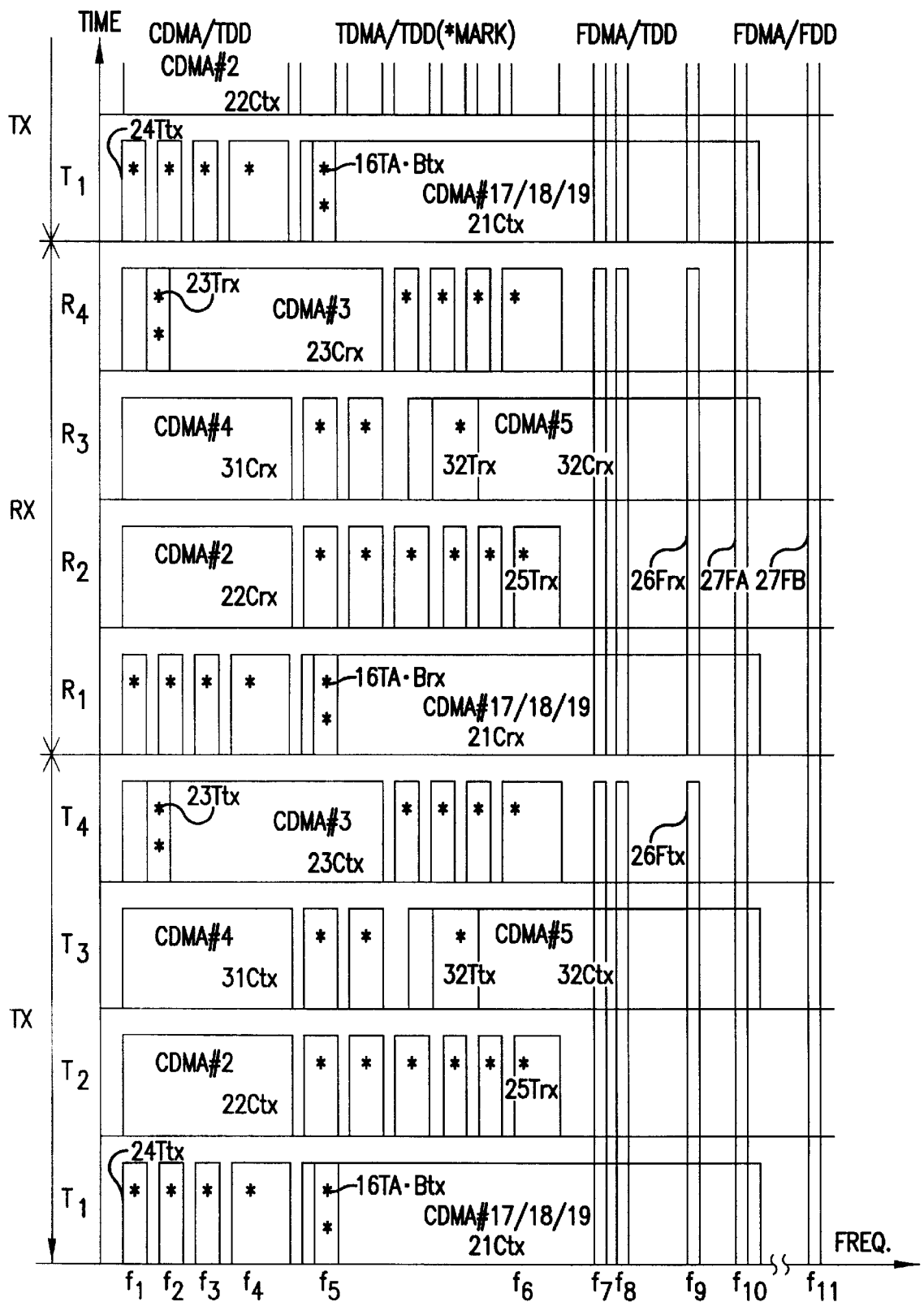
FIG. 4 is a detailed chart explaining a relationship between the frequency spectrum and the time slot of communication signal for the embodiment 1.

FIG. 4 is a detailed chart for time slot sharing and frequency sharing of communication signals, on the relationship of frequency spectrum and time slot for embodiment 1.

The horizontal axis is a frequency, and the vertical axis is a time in FIG. 4. Frequency f1~f11 on the horizontal axis is indicating frequencies. TX is the time assigned for the base station transmitter, and RX is the time assigned for the base station receiver. T1~T4 is the time segments that time divides the time TX assigned for transmitter into four. R1~R4 is the time segments that time divides the time RX assigned for receiver into four. In the TDD system, one set of TX and RX makes one frame. That is, in the embodiment, a single frame is divided into half to make two half frames for transmitter and receiver. The divided frames are time divided into four each. However, the number of time slot is not limited to this example.

Slot 21Ctx is transmitting time slot of time divided CDMA type, and slot 21Crx is receiving time slot of the same type. In the present mobile communication system, the signals based on CDMA is segmented by means of time slots. The time divided CDMA signals #17, #18 and #19 with three different spreading codes are assigned to the slot 21Ctx/21Crx. Instead, like a general CDMA signal, all of the time slots can be assigned to a single CDMA signal. In such a case, similarly to time segment T1, time segments of T2, T3 and T4 can be used by the same CDMA signal.

The followings are the time divided CDMA type for transmitting and receiving time slots, namely (transmitter/receiver pair): slot 22Ctx/22Crx, slot 23Ctx/23Crx, slot 31Ctx/31Crx, and slot 32Ctx/32Crx, as well as slot 21Ctx/21Crx. The time divided CDMA signals #2, #3, #4 and #5 are assigned to the respective time slots.

Slot 16TA·Btx/16 TA·Brx is the TDMA type of time slot. In this slot, two different synchronization TDMA signals identified by synchronization word codes are assigned. (TDMA signals #16A and #16B of FIG. 2). Likewise, slot 23Ttx/23Trx, slot 24Ttx/24Trx, slot 25Ttx/25Trx, and slot 32Ttx/32Trx are the TDMA type of time slots. Slot 26Ftx/26Frx is a FDMA-TDD type of time slot, which is used in a control channel or a radiotelephone communication channel. Slot 27FA and 27FB are FDMA-FDD type of frequency slots.

An intermingled relationship between the FDMA signal, the TDMA signal identified by synchronization word codes, and the time divided CDMA signal as shown in FIG. 2 are illustrated on a region of frequency f5 and f6 and transmitter and receiver time segments T1 and R1 of FIG. 4. In this region, the time divided CDMA signals #17, #18 and #19 (slot 21Ctx/21Crx) are sharing a part of frequency and a time segment (T1/R1) with the followings: a FDMA-FDD signal (slot 27FA); a FDMA-TDD signal (slot 26Ftx/26Frx); the TDMA signal identified by synchronization word codes (slot 16TA Btx/16TA·Brx).

Likewise, a TDMA signal (slot 23Ttx/23Trx) is sharing a part of frequency and a time segment (T4/R4) with time divided CDMA signal #3 (slot 23Ctx/23Crx).

Likewise, a time divided CDMA signal #5 (slot 32Ctx/32Crx) is sharing a part of frequency and a time segment (T3/R3)with the FDMA-FDD signal (slot 27FA); the FDMA-TDD signal (slot 26Ftx/26Frx); and the TDMA signal (slot 32Ttx/32Trx).

Figure 5:
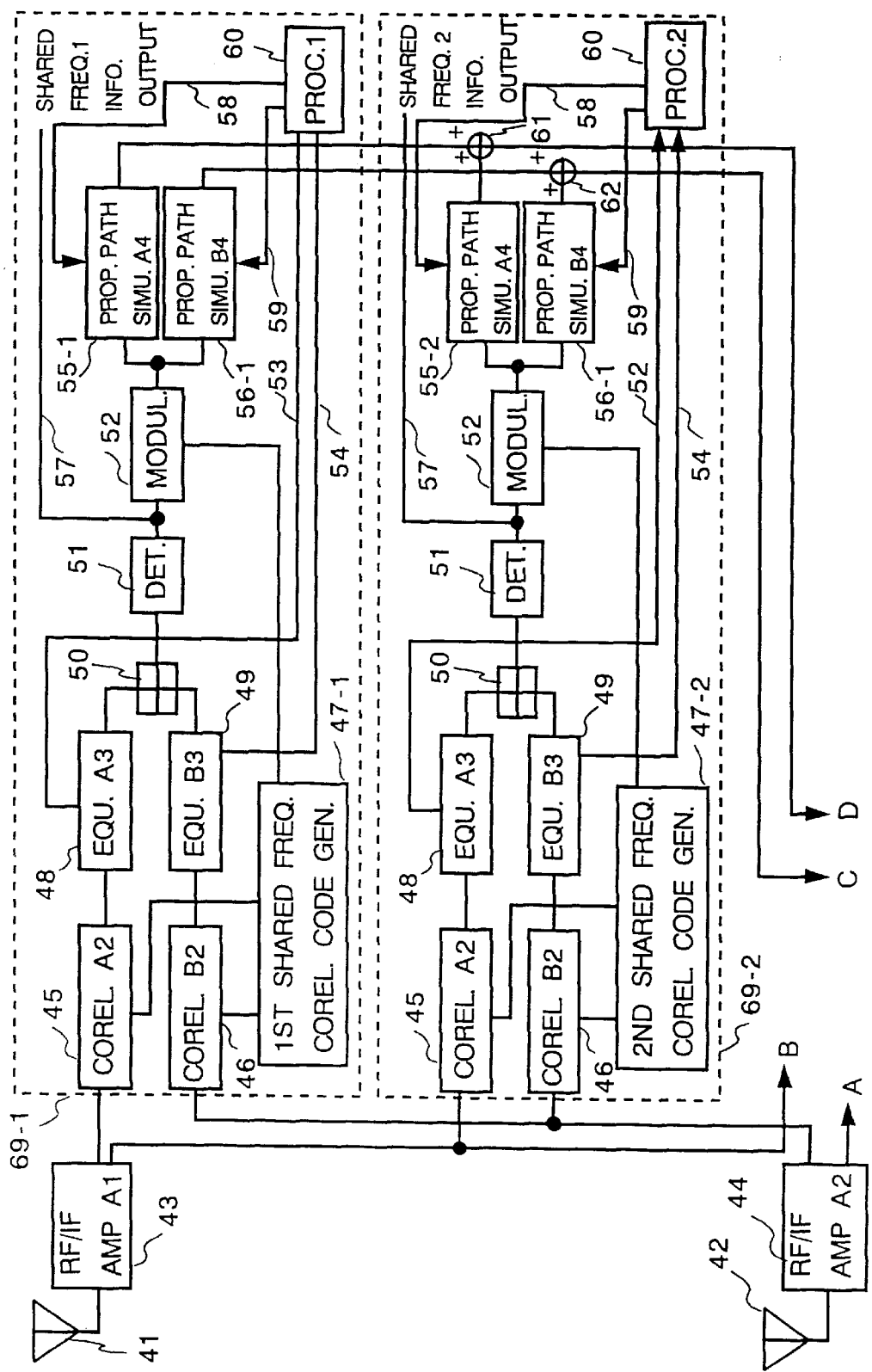
FIG. 5 is a block chart of antenna diversity receiver for the embodiment 1 (1/2)
Figure 6:
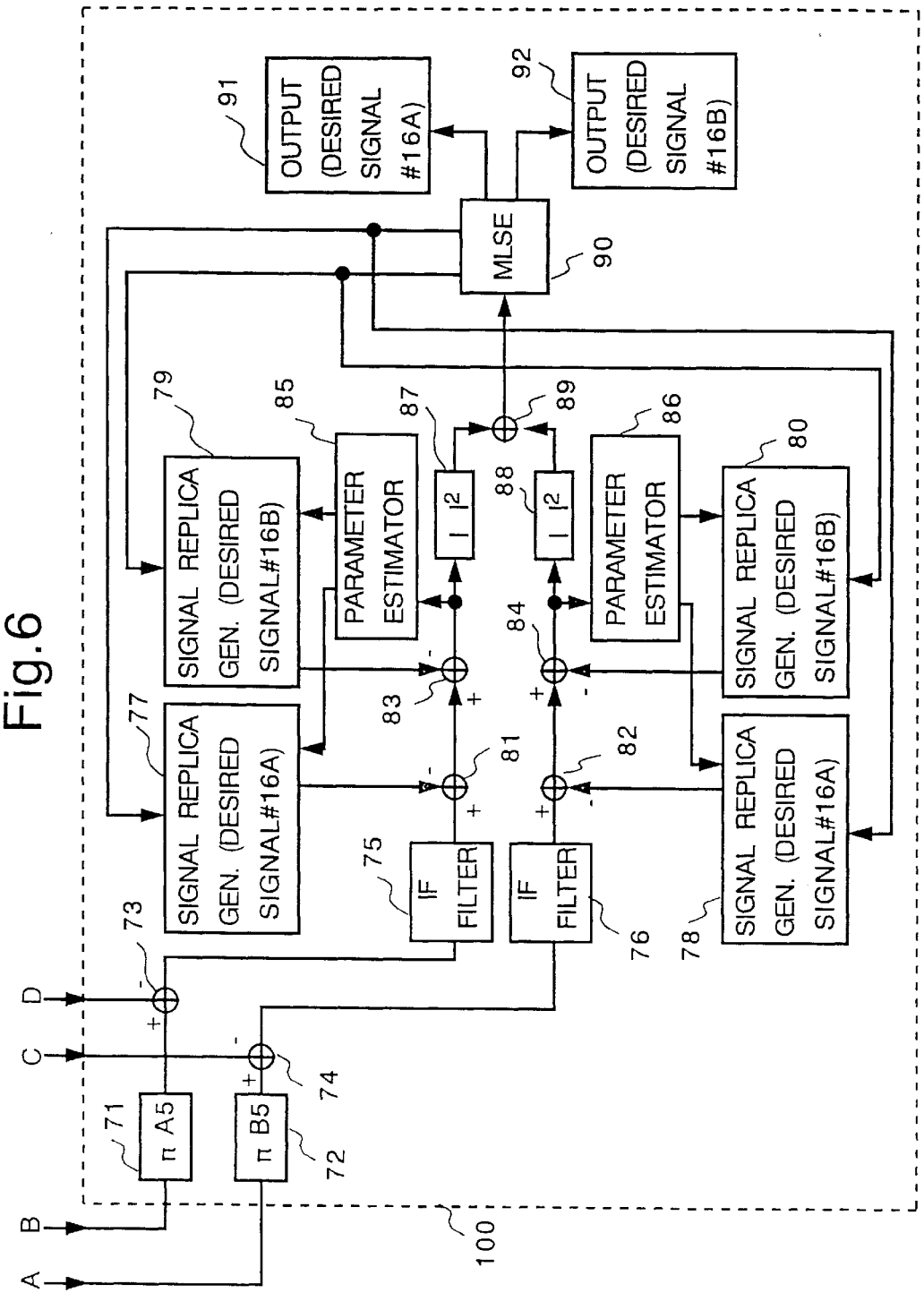
FIG. 6 is a block chart of antenna diversity receiver for the embodiment 1 (2/2)

FIGS. 5 and 6 are block charts of antenna diversity receivers (hereinafter receiver) of the mobile communication system of embodiment 1. The receiver is set at either the mobile station or base station where CDMA signal or time divided CDMA signal carried by a received communication signal is regenerated as a shared signal. The receiver has a function to cancel the shared signal from the communication signal and extract TDMA signals #16A and #16B identified by synchronization word codes as a desired signal shown in FIGS. 2 and 3.

In FIG. 5, 41 and 42 are diversity antennas (hereinafter antenna) that are equivalent to 7 and 8 or 9 and 10 of FIG. 1. 43 and 44 are RF amplifiers (RF/IF AMP). Antennas 41 and 42 inputs a communication signal which is a radio frequency signal. The radio frequency signal is amplified by a fixed amplification factor in the RF/IF AMP. The amplified radio frequency signal is mixed with a locally oscillated signal outputted from a local oscillator (not illustrated) and is transformed into an intermediate frequency signal in the RF/IF AMP. The intermediate frequency signal has the following frequency components: an intermediate frequency f0 of the CDMA signal or time divided CDMA signal; and an intermediate frequency f0+n*fd of the FDMA signal or TDMA signal which is the desired signal(n: 0,±1,±2..., fd: frequency interval for a contiguous channel of the FDMA signal or TDMA signal).

The dotted outlines on FIG. 5 (69-1 and 69-2) are for regenerating shared signals which is an interference signal within a communication signal. The required number of shared signal regeneration units of shared signals that need be generated and canceled is prepared. FIG. 5 illustrates two shared signal generation units that uses time divided CDMA signal as the shared signal. Following is a detailed explanation on the configuration of the shared signal regeneration unit.

45 and 46 are CDMA orthogonal code corellators (hereinafter corellator) that inputs the intermediate frequency signals outputted from RF amplifiers 43 and 44. The corellator uses an corellated code signal from a corellated code generator 47-1(47-2) to extract a symbol rate signal from the CDMA signal or the time divided CDMA signal. The symbol rate signal detected by the corellators 43 and 44 are inputted to equalizers 48 and 49, which cancels the interference caused by multipath transmissions. The outputs from the equalizers 48 and 49 are added using an adder 50, and the adder 50 outputs shared channel signal with the canceled transmission interference. The adder has the following adding methods: selection combining; equal-gain combining; maximal-ratio combining ; and maximal-square combining. The output of adder is measured by a detector 51 where a channel sharing information 57 (information outputs of shared frequencies 1 and 2) is obtained. When the receiver is set at the base station of the mobile communication system where a frequency sharing is possible, the channel sharing information 57 is used as an information to receive its signal transmitted from the mobile station.

52 is a digital modulator for shared channel. Using the output signals (corellated code signal from the corellated code generator 47-1(47-2) and channel sharing information from the detector 51), an inner transmitter (not illustrated) modulates the signals to output an inner modulation signal for shared channel. The inner modulation signal for shared channel does not possess a noise signal component. (The noise signal component is included in the shared channel signal which is the input signal of detector 51.) Therefore, if shared signal component is canceled from the communication input signal of detector 51, an addition of the noise signal component is prevented.

An inner modulation signal for shared channel is inputted to two propagation path simulators 55-1 (55-2) and 56-1 (56-2). The propagation path simulator simulates propagation path properties used in multipath transmissions. The simulator 55-1 (55-2) simulates a propagation path property of the shared signal arriving at antenna 41, and the simulator 56-1 (56-2) simulates a propagation path property of the shared signal arriving at antenna 42. Propagation path coefficients 58 and 59 show the propagation path property of the simulators 55-1 (55-2) and 56-1 (56-2). The propagation path coefficient 58 and 59 are generated by inverse matrix of equalizer coefficients 53 and 54 in the equalizers 48 and 49. The inverse matrix is generated from a processor 60. A propagation path for shared signal leading to the antenna 41 is implemented by the propagation path simulator 55-1 (55-2) using the equalizer coefficient from the equalizer 48. The propagation path for shared signal leading to the antenna 42 is implemented by the propagation path simulator 56-1 (56-2) using the equalizer coefficient from the equalizer 49. The shared frequency regeneration unit is configured from blocks 45~60. In FIG. 5, two of the shared frequency regeneration units are illustrated. The number of units that need be set is the number of shared frequency signals. 61 and 62 are adders that regenerates shared frequency signal separately. In FIG. 5, the adders 61 and 62 are drawn in the shared frequency regeneration unit 69-2 for a reason of convenience.

The dotted outline 100 of FIG. 6 is a desired signal regeneration unit. The previously described shared signal is regenerated separately from a communication signal by the shared signal regeneration unit 69-1 (69-2) and the shared signal added by the adders 61 and 62 is canceled from a communication signal to regenerate the desired signal. Following is an explanation of configuration for the desired signal regeneration unit.

71 and 72 are delay circuits. The delay circuits input intermediate frequency signals that is outputted from RF/IF amplifiers 43 and 44 and delay the intermediate frequency signal for a period of time until the shared signal regeneration units generate the shared signal. 73 and 74 are adders which subtracts the shared signal which is an output from the adders 61 and 62 from the output signal of the delay circuits 71 and 72. The adder functions as a shared signal removing unit.

75 and 76 are amplifiers with filters attached. The filtered amplifiers select and amplify the desired signal of FDMA/TDMA from an output signal of the adders 73 and 74 by canceling the shared signal. 77 and 78 are signal replica generators where a replica of TDMA signal #16A identified by synchronization word code is generated based on the propagation path parameters of estimators 85 and 86, and based on a symbol candidate signal from a MLSE 90 which will be described later. 79 and 80 are signal replica generators where a replica of TDMA signal #16B identified by synchronization word code is generated. 81, 82, 83 and 84 are adders which cancel each replica signal and output pre-estimated error signal. Parameter estimators 85 and 86 estimate the propagation path parameters of multipath transmission.

A square error signal synthesizers 87 and 88 squares the pre-estimated error signal and outputs square error signal. 89 is an adder that creates and outputs the square error signal from the square error signal synthesizers. The MLSE 90 inputs square error signal from the adder 89 and outputs the TDMA signals #16A and #16B identified by synchronization word codes which are desired signal and symbol candidate signal, by using a Viterbi algorithm. 91 and 92 are outputs of the desired signals #16A and #16B.

A detailed explanation for the configuration of the operation after passing the filtered amplifiers 75 and 76 are mentioned in papers by Jin Yoshino et al., entitled "Performance of Interference Canceling Equalizer (ICE) for Mobile Radio Communication", Institute of Electronics, Information and Communication Engineers of Japan, 1996 Communication Society Conference Paper B-412, and also on paper entitled "Adaptive Interference Canceler Based on RLS-MLSE", Journal for the Society of Electronic Information Communication 1994, B-2Vol., J77-B-2No.2.

Although no explanation in this specification is made on what kind of filters or amplifiers should be used in the corellators 45 and 46 and filtered amplifiers 75 and 76, however, it should be assumed that the amplifiers have a decent amplification degree and filters are equipped with an appropriate band-pass filter. These functions can be implemented at either a hardware or at a software.

In the previous explanation, the time divided CDMA signals as shared signal was canceled from the communication signal to extract TDMA signal identified by for synchronization word code as desired signal. This relationship can be reversed. That is, TDMA signal identified by for synchronization word code as shared signal, and time divided CDMA signal as desired signal. In such a case, the TDMA signal identified by synchronization word code is regenerated at the shared signal regeneration unit, and time divided CDMA signal is regenerated at the desired signal regeneration unit. For obvious reason, configurations of each regeneration unit should be appropriate for regeneration of each signal.

The embodiment 1 thus described, the configuration of mobile communication system is effective for frequency sharing and time slot sharing using communication signals based on a plurality of access methods that the number of radiotelephone communication channels can be increased. In addition, an installment of the invention at the base station would be effective in which it can eliminate system failure at the base station, when an excess level of communication signal is generated in the channel going from mobile station to base station. Further, an installment of the invention to the mobile station would be effective in which the number of channels can be increased to simultaneously receive the TDMA signals having different synchronization word codes at two different base stations, further, the simultaneous receiving the TDMA signals can be implemented using single channel occupying same time slot and same frequency.

Embodiment 2.

Figure 7:
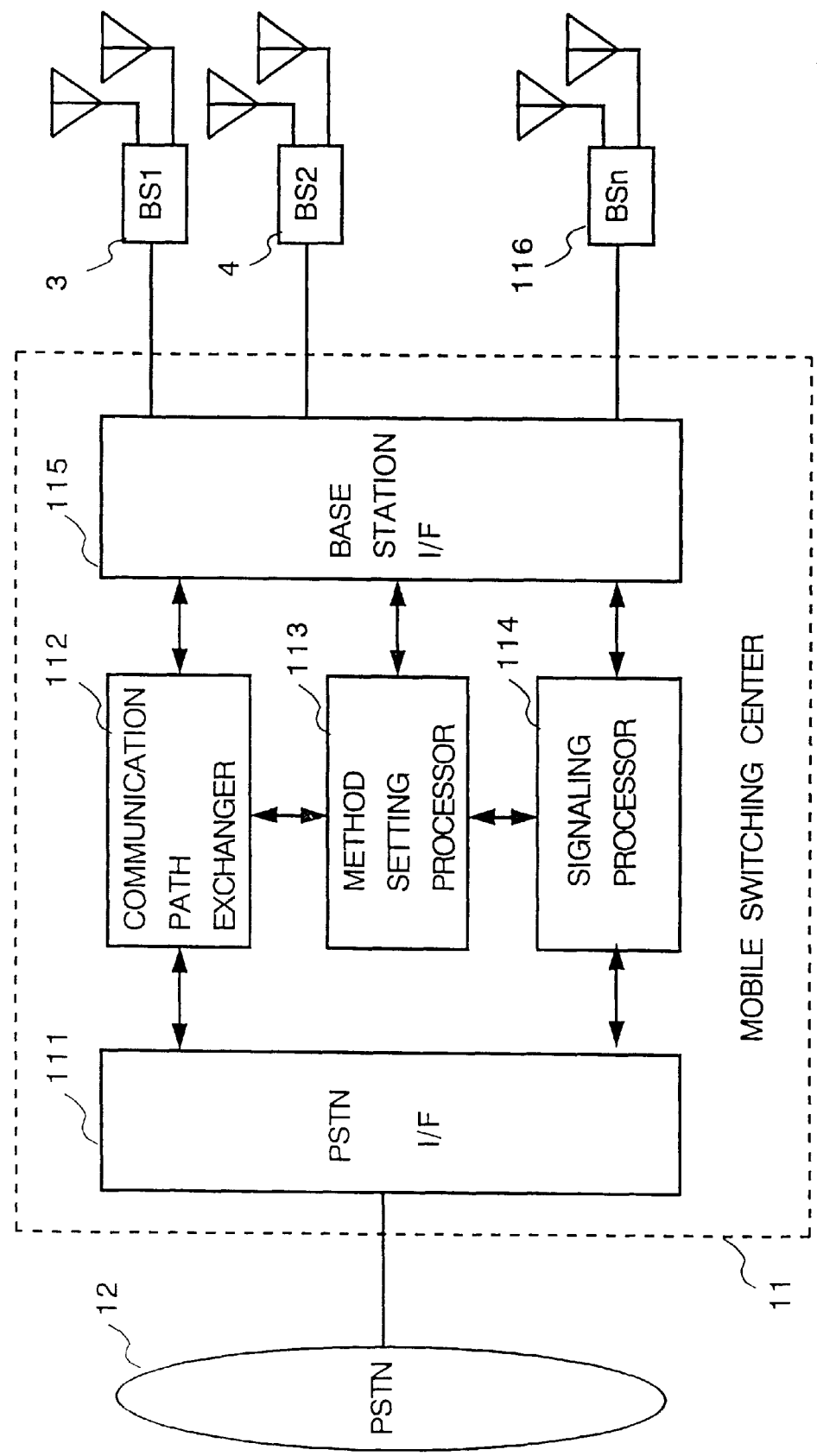
FIG. 7 is a block chart of mobile switching center for the embodiment 2.

The mobile communication system of embodiment 2 according to this invention is described below. FIG. 7 is a block chart illustrating a mobile switching center implementing frequency and time slot sharing in the mobile communication system for the embodiment 2. Following is the description of numbered components indicated on the figure. 111 is a PSTN interface unit connected with a public switching telephone network 12. 115 is a base station interface unit connected to base stations. 113 is a method setting processor controlling access methods applied for transmission between the base stations and mobile station connected to the mobile switching center. The method setting processor is comprising of the followings: a data control memory unit memorizing a control data related to various access methods which will be described later; and an access method control unit for the system controlling various access methods between the mobile station and the base station inside the system based on the control data. 112 is a communication path exchanger controlling exchanges between the PSTN interface unit and the base station interface unit, based on the control of previously mentioned method setting processor. 114 is a signaling processor controlling the whole mobile switching center, such as processing of telephone numbers. 3, 4 and 116 are the mobile base stations.

FIG. 8 is control table for communication method parameters (hereinafter parameter) which is a control data stored in the data control memory unit at the previously mentioned method setting processors 113. The control table includes various parameters related to the radio access methods used in radio connections between the base stations and the mobile station. The parameters are classified for every channel communication, and the parameters are made from a various accompanying information to the communication channel. The followings are the accompanying information as of FIG. 8: a time slot number for each channel communication; a number for frequency channel; a data rate; a transmission type (access methods); chip rate (for CDMA method); information for identifying access method (synchronization word code for TDMA, and various spreading code numbers for CDMA). In the control table, information corresponding to communication channels 1015 and 1016 are defining parameters of communication channel used by the mobile station 1 (MS1) shown in FIG. 1. That is, the mobile station 1 (MS1) has two communication channels. Further, the two communication channels are on a same frequency channel of number 5. In addition, the time slot number are also same with time slot number being 1. However, the synchronization word codes are different being SyW1 and SyW2, and the difference allows for the two communication channels to identify from each other.

In addition to defining the frequency channel and time slot, it is important to distinguish the TDMA signal and CDMA signal (spreading code for CDMA and synchronization word code for TDMA). Both codes of the TDMA and CDMA methods are controlled at the same level as an access method identifying information in the control table. That is, the method setting processor is provided with functions for controlling and identifying mobile communication channels having a plurality of synchronization word codes, to implement time slot sharing and frequency sharing of TDMA signal. Moreover, since the synchronization word codes of TDMA signal and the spreading codes of CDMA signal are controlled in the same level, the access method can be assigned with consideration of the overall communication system quality.

In the previous explanation, the method setting processor is provided at the mobile switching center. This is done so for the mobile switching center to control the access methods related to a plurality of base stations in the mobile communication system. A similar method setting processor is provided at the base station having a similar function as per above, to control the access method within a cell of the base station. The communication method inside the cell of base station is controlled based on this control. In such a case, previously mentioned data control memory unit becomes a data control memory unit of the base station, and the system access method control unit becomes an access method control unit of the base station.

The embodiment 2 thus described, a configuration of the method setting processor at the mobile switching center simultaneously controls the synchronization word codes of TDMA signal and the spreading codes of time divided CDMA signal according to the control table. For a plurality of TDMA signals and time divided CDMA signals, the access methods are effectively assigned and controlled with consideration of the overall communication system quality.
Embodiment 3.

Figure 9:
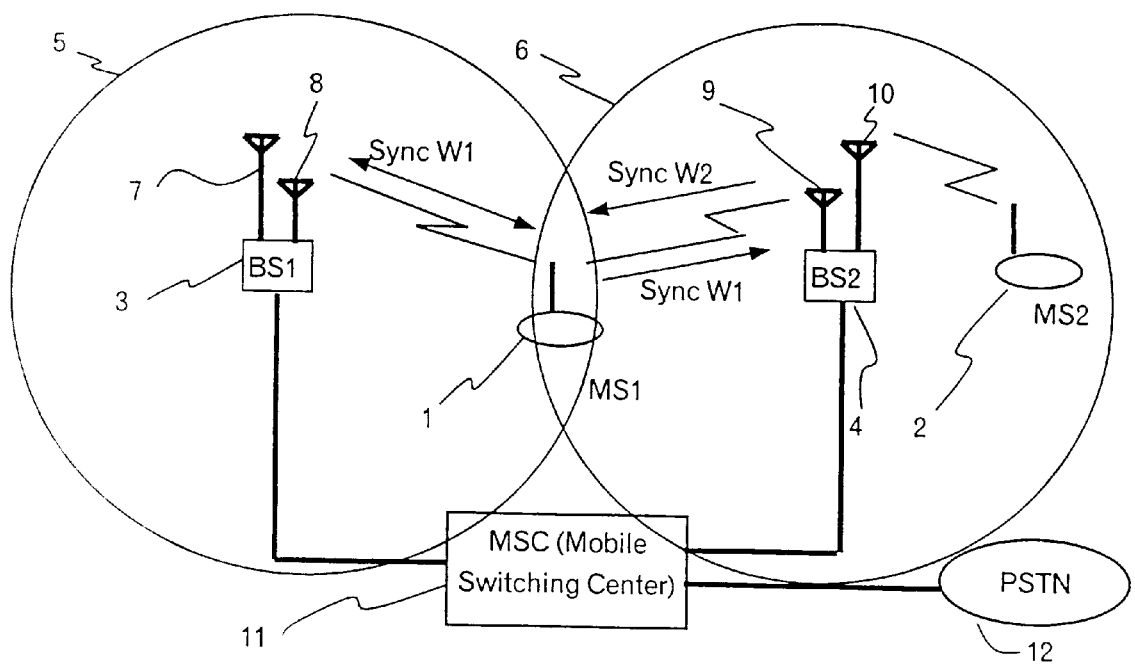
FIG. 9 is a mobile communication system block chart for the embodiment 3.

The mobile communication system of embodiment 3 according to this invention is described below. FIG. 9 is a system block chart of the mobile communication system implementing the time slot sharing and frequency sharing for the embodiment 3. FIG. 9 illustrates a situation where the mobile station 1 (MS1) of FIG. 1 is separated from the base station 3 (BS1), and is gradually entering a zone of the base station 4 (BS2)

FIG. 10 is a control table for transmission power information which are control data stored in the memory of the method setting processor of the mobile communication system for the embodiment 3. Included in the control data there are information related to the transmitter and receiver powers of base/mobile stations, which are regarded as accompanying information to each of the communication channel in FIG. 10. It is assumed that an electric field strength for receiver is classified into 4 classes (3:maximum receiving intensity, 2:medium receiving intensity, 1:optimal receiving intensity, 0:zero signal). An intermediate numerical value for each class, for example 0.5, is not the optimal receiving intensity nor a zero signal. The numerical value inside the bracket indicates a signal level of electric wave transmitted by the base station and received by the adjoining base station. As an example, for a communication channel 1016, the base station 3 (BS1) is receiving transmission signal from the base station 4 (BS2) at the intensity of class 0.5. Further, it is assumed that an electric field strength for transmitter is classified into 4 classes (3:maximum transmitting intensity, 2:medium transmitting intensity, 1:optimal transmitting intensity, 0:zero signal). A communication channel 1015 is used between the mobile station 1 (MS1) and the base station 3 (BS1). Simultaneously, the mobile station 1 (MS1) is receiving information from the base station 4 (BS2) using the communication channel 1016 with same time slot and frequency but a different synchronization word code. That is, two communication channels are simultaneously set between the mobile station 1 (MS1) and the two base stations.

Figure 11:
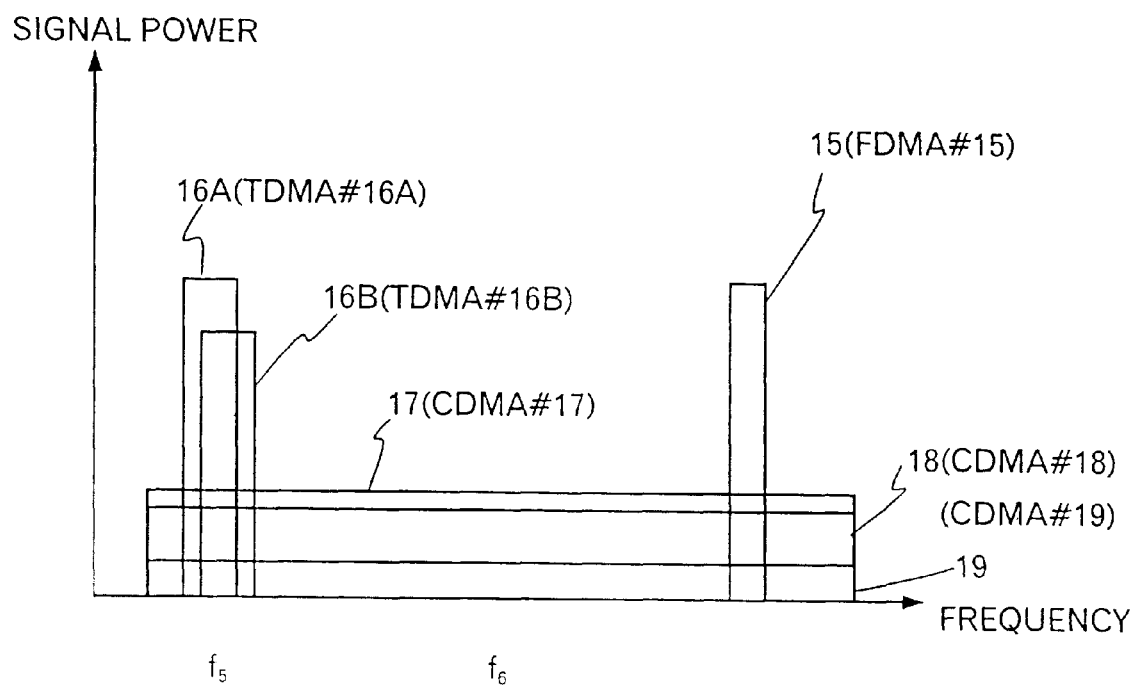
FIG. 11 is a frequency spectrum of frequency sharing communication signal received at the mobile station for the embodiment 3.

FIG. 11 explains the frequency spectrum for frequency sharing of a communication signal received at the mobile station 1 (MS1) for the embodiment 3. Type of signals and frequency spectrum for FIG. 11 is as described in FIG. 2. For the embodiment 3, the mobile station 1 (MS1) is separated from the base station 3 (BS1), and it is approaching the base station 4 (BS2). FIG. 11 differs from FIG. 2 in the difference in signal power level for TDMA signal #16A and TDMA signal #16B, and the power level difference between TDMA signal #16A and TDMA signal #16B is narrower. This embodiment does not refer to receiving level of CDMA signal at the mobile station, because it is same as the receiving level shown in FIG. 2.

Figure 12:
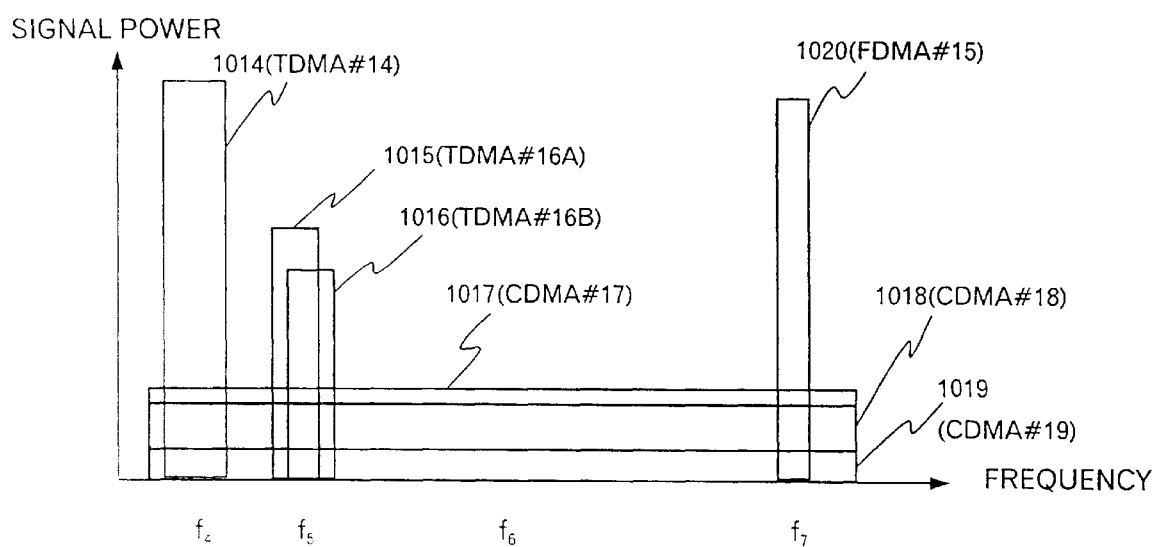
FIG. 12 is a frequency spectrum of frequency sharing communication signal received at the base station for the embodiment 3.
Figure 14:
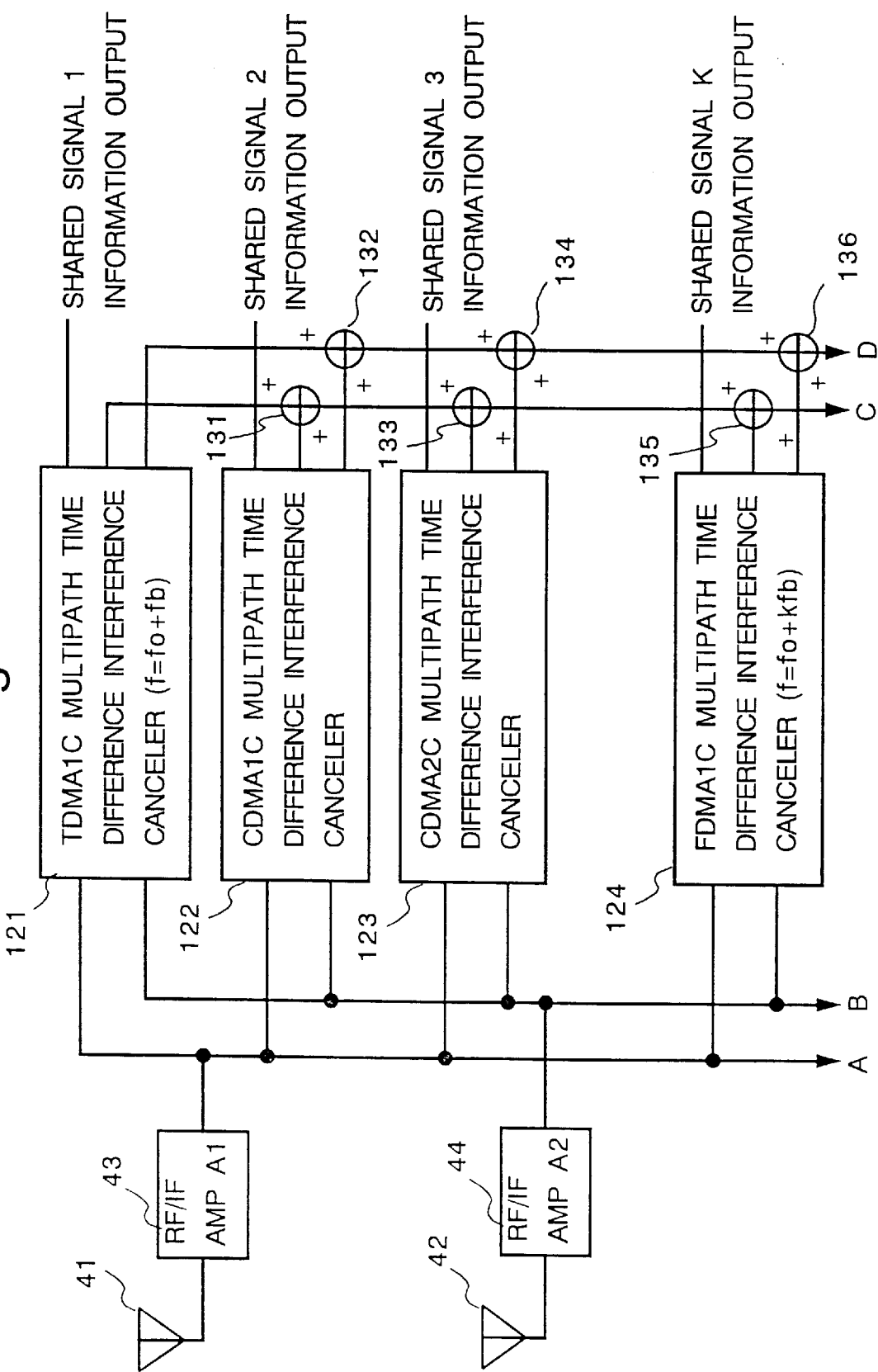
FIG. 14 is a block chart of antenna diversity receiver for the embodiment 3 (1/2)
Figure 15:
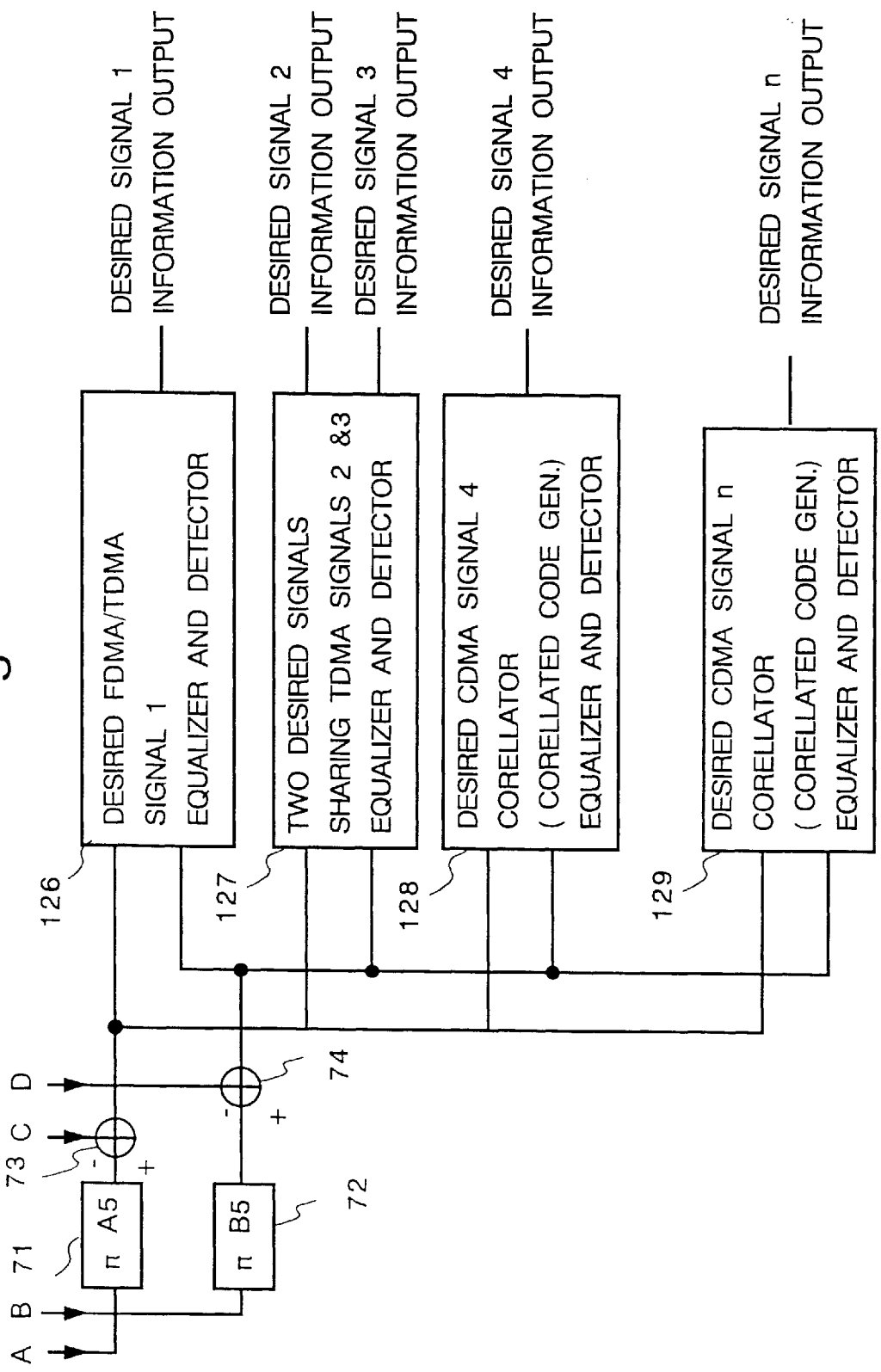
FIG. 15 is a block chart of antenna diversity receiver for the embodiment 3 (2/2)

FIG. 12 explains the frequency spectrum for frequency sharing of a communication signal received at the base station 3 (BS1) for the embodiment 3. FIG. 13 is the control table for operation control information on the shared signal regeneration unit (shared signal canceler) and desired signal (desired signal receiver) stored in the memory of base station 3 (BS1) at the method setting processors 113. In FIG. 13 information related to the shared signal canceler and the desired signal receiver selected at the receiver of base station is included as an accompanying information to the communication channel. The classification of the electric field strength for receiving is same as in FIG. 10. FIGS. 14 and 15 are block charts of antenna diversity receivers at base stations for the embodiment 3. Communication channels are set for every communication at the receiver, responding to the control table of FIG. 13, and either the shared signal canceler or the desired signal receiver is set there. FIGS. 14 and 15 are showing a functional blocks of base station for the general case, that is, the shared signals as a plurality of FDMA signal, TDMA signal and CDMA signal, and the desired signals as a plurality of FDMA signal, TDMA signal and CDMA signal.

Figure 16:
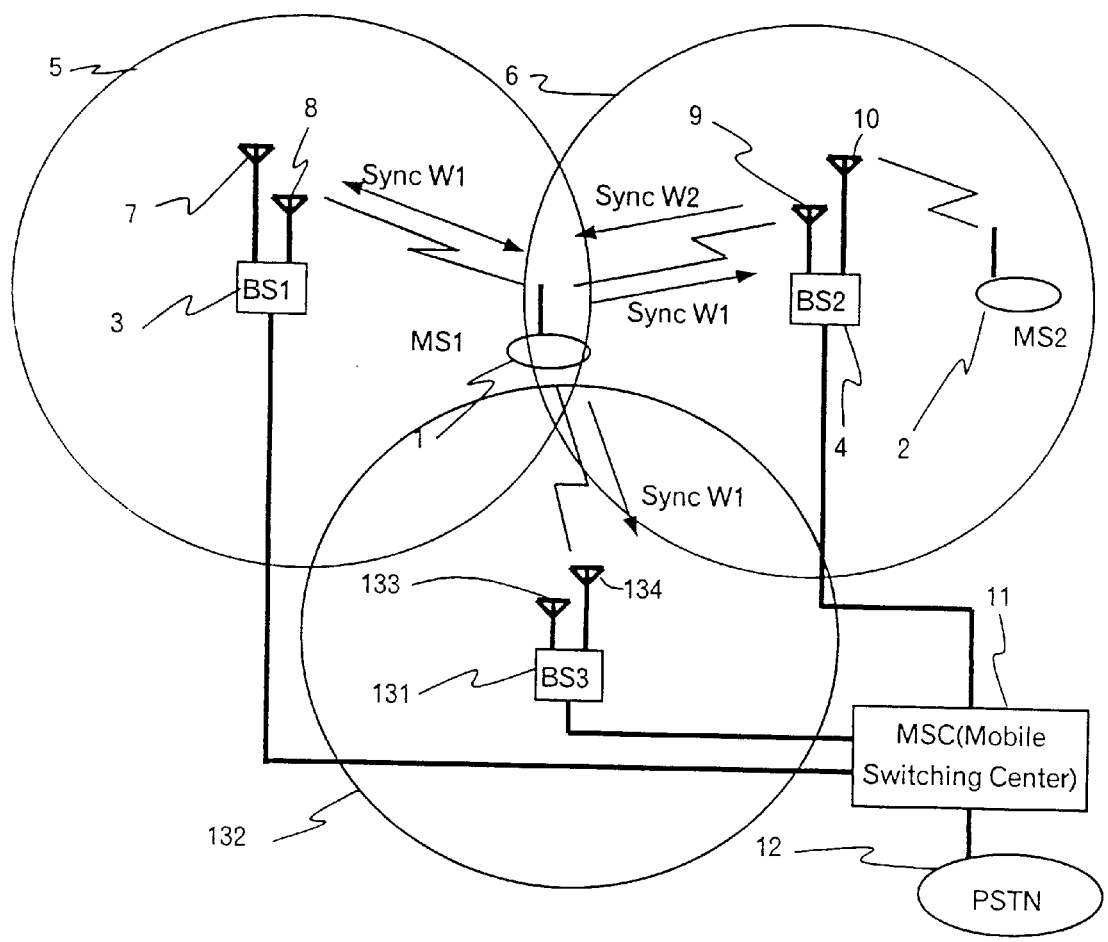
FIG. 16 is an another mobile communication system block for the embodiment 3.
Figure 18:
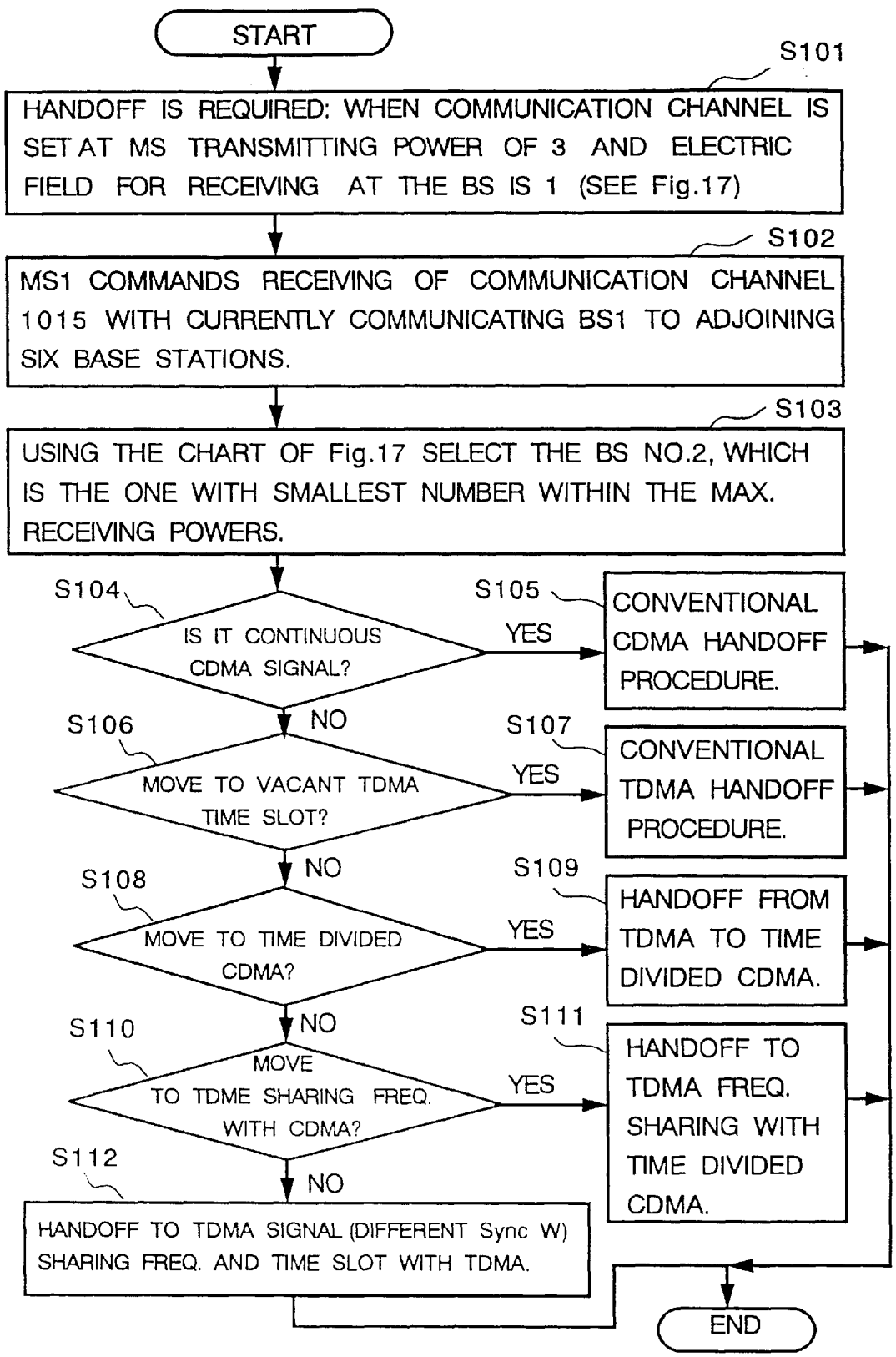
FIG. 18 is a flow chart of handoff sequence for the embodiment 3.

FIG. 16 is a system block chart of another mobile communication system implementing time slot sharing and frequency sharing for the embodiment 3. FIG. 17 explains the control table for deciding a handoff receiving power information stored in the memory of the method setting processors 113, used in the mobile communication system of the embodiment 3 (refer to FIG. 16). The division of classes in the electric field strength for receiving is same as in FIG. 10. The communication channels 1013 and 1016 use TDMA signals assigned at the base station 4 (BS2), however, on this figure, the communication channels 1013 and 1016 has no call and are indicating vacant channels. For FIG. 17 when the transmitting power of the mobile station is at a maximum of 3 and electric field strength for receiving at base station is 1 as in the communication channels 1015 and 1017, the mobile station is assumed to be located at an outermost zone. FIG. 18 is a handoff sequence flow chart of the mobile station for the embodiment 3.

Means for reaching a handoff decision in the mobile communication system is explained using FIGS. 17 and 18.

The first step S101 in handoff operation is to select a communication channel where the transmitting power of mobile station is 3, and electric field strength for receiving the signal at the base station is 1. Using FIG. 17 as an example, communication channel 1015 is selected. After the selection, that is in step S101, the process does not yet proceed to S102, not until after checking for a bit rate error of communication channel and if it is found to exceed a certain value (threshold value) the step proceeds to S102. Therefore, at S101, a processor searches the bit rate error in a plurality of communication channels in order, and from the communication channel with the error value exceeding a certain value the handoff procedure can commence, or in other words, proceeds to S102.

In step S102, following sequences are executed: an up link signal of communication channel 1015 transmitted from the mobile station 1 (MS1) to the base station 3 (BS1) is received by the six adjoining base stations in order, then the result is notified and written on the control table of receiving power information at the method setting processor of the mobile switching center of FIG. 17. In step S103, the following sequence is executed: for each adjoining base station the base station with maximum electric field (for receiving) is selected as handoff destination (if the electric field is the same, select the one with smallest number). For the example of FIG. 17, the base station 4 (BS2) is selected.

After step S104, a handoff procedure is executed responding to the signal type at handoff destination. For instance, if the signal at the handoff destination is a conventional type of continuous-time CDMA signal (step S104), the handoff procedure corresponding to the CDMA signal is executed (step S105). The explanation of the handoff procedure is omitted, since much number of handoff procedures had already been announced.

In step S106 when there is a plenty of time slots available to an extent that handoff can be performed by moving to an another time slot, then the conventional TDMA handoff procedure is executed (step S107). The explanation of the handoff procedure is omitted, since much number of handoff procedure had already been announced. This is similarly so for the case of moving to the same time slot with different frequency.

In a case when handoff is performed by moving from TDMA signal to time divided CDMA signal assigned to time slot (step S108), a handoff procedure using time divided CDMA signal (step S109) is executed. The handoff procedure using time divided CDMA signal was described in aforementioned patent application filed by us.

In steps S104, S106, and S108 when the time slot to use is not available, handoff is implemented for TDMA signal that is sharing the same frequency with time divided CDMA signal. As such TDMA signal, communication channel 1013 of FIG. 17 is suitable. The communication channel 1013 is a communication channel for TDMA signal assigned to the base station 4 (BS2), however, currently there is no call and is an vacant channel. The detail of handoff sequence to the communication channel 1013 (step S111) is explained in embodiment 4.

At step S110 of FIG. 18, when TDMA signal that is sharing frequency and time slot with the time divided CDMA signal does not exist (On FIG. 17 when communication channel 1013 is occupied), the step proceeds to step S112 the TDMA signal that is sharing the frequency and time slot with the existing TDMA signal (TDMA signal identified by synchronization word code. In the case of FIG. 17, communication channel 1016 (16B)) is used. Detail of handoff sequence (step S112) from the communication channel 1015 (BS1) and 1016 (BS2) are explained in embodiment 5.

The embodiment 3 thus described, i.e., transmission power level of communication signal of each base station/ mobile station is controlled at the method setting processor in the mobile switching center, the configuration is effective to implement handoff within the cell of communication system using sharing frequency and time-slot for TDMA, CDMA and FDMA signals. In addition, since the sharing signal canceler and desired signal receiver corresponding to a plurality of TDMA signal, CDMA signal and FDMA signal inside the diversity receiver are provided, and since the sharing signal canceler and the desired signal receiver is controlled for each one of the communication channel by the method setting processor of mobile switching center, therefore, canceling of the shared signal and extracting the desired signal is effectively implemented.

Embodiment 4.

Figure 19:
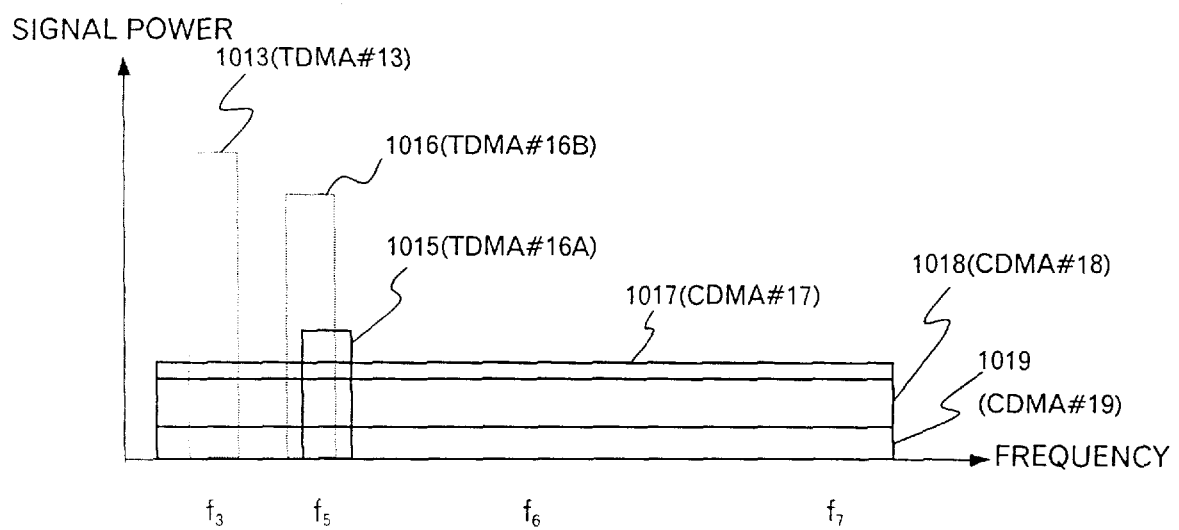
FIG. 19 is a frequency spectrum of frequency sharing communication signal received at the base station for the embodiment 4.

The mobile communication system of embodiment 4 according to this invention is described below. The embodiment 4 is related to handoff sequence (step S111 of FIG. 18) of TDMA signal frequency sharing and time slot sharing with time divided CDMA signal. As a result of the handoff sequence in FIG. 18, when step S111 is selected, the step starts with checking the time divided CDMA signal in the surrounding handoff destination base station 4 (BS2). FIG. 19 is a frequency spectrum of communication signal received at the base station 4 (BS2) for the embodiment 4. The dotted line of communication channels 1013 and 1016 in FIG. 19 indicate these are vacant channels. The frequency spectrum shown in FIG. 19 is indicating an input signal status of the receiver of handoff destination base station 4 (BS2) before commencing the handoff. FIG. 20 is control table of operational control information for shared signal canceler and desired signal receiver of base station 4 (BS2) stored in the memory inside the method setting processor for the embodiment 4. The classifying of the electric field strength for receiving is same as in FIG. 10. On this figure, TDMA signals are assigned to the communication channels 1013 and 1016 at the base station 4 (BS2), however, currently there is no call and is showing a vacant channel.

Figure 21:
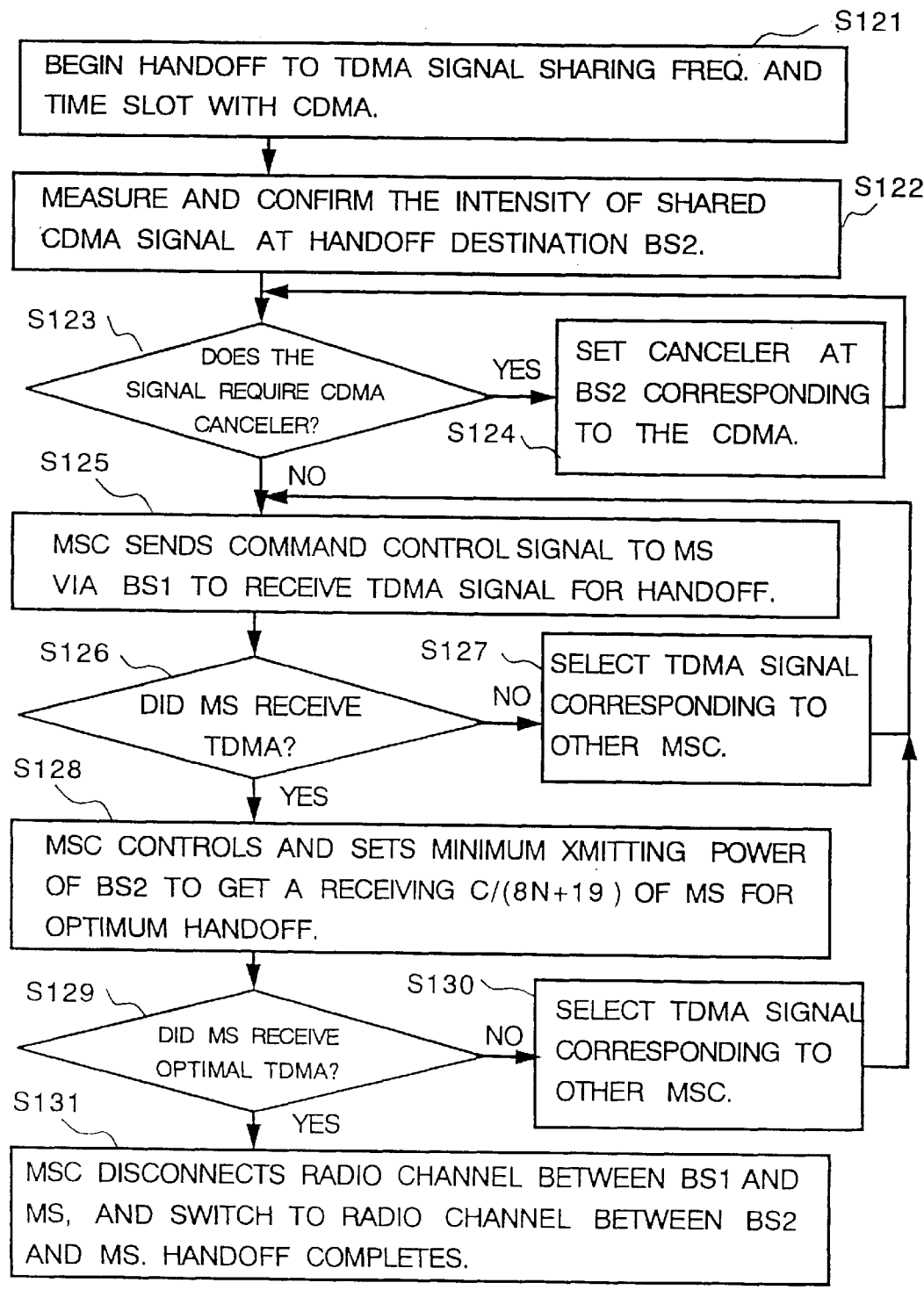
FIG. 21 is a flow chart of handoff sequence for the embodiment 4.
Figure 22:
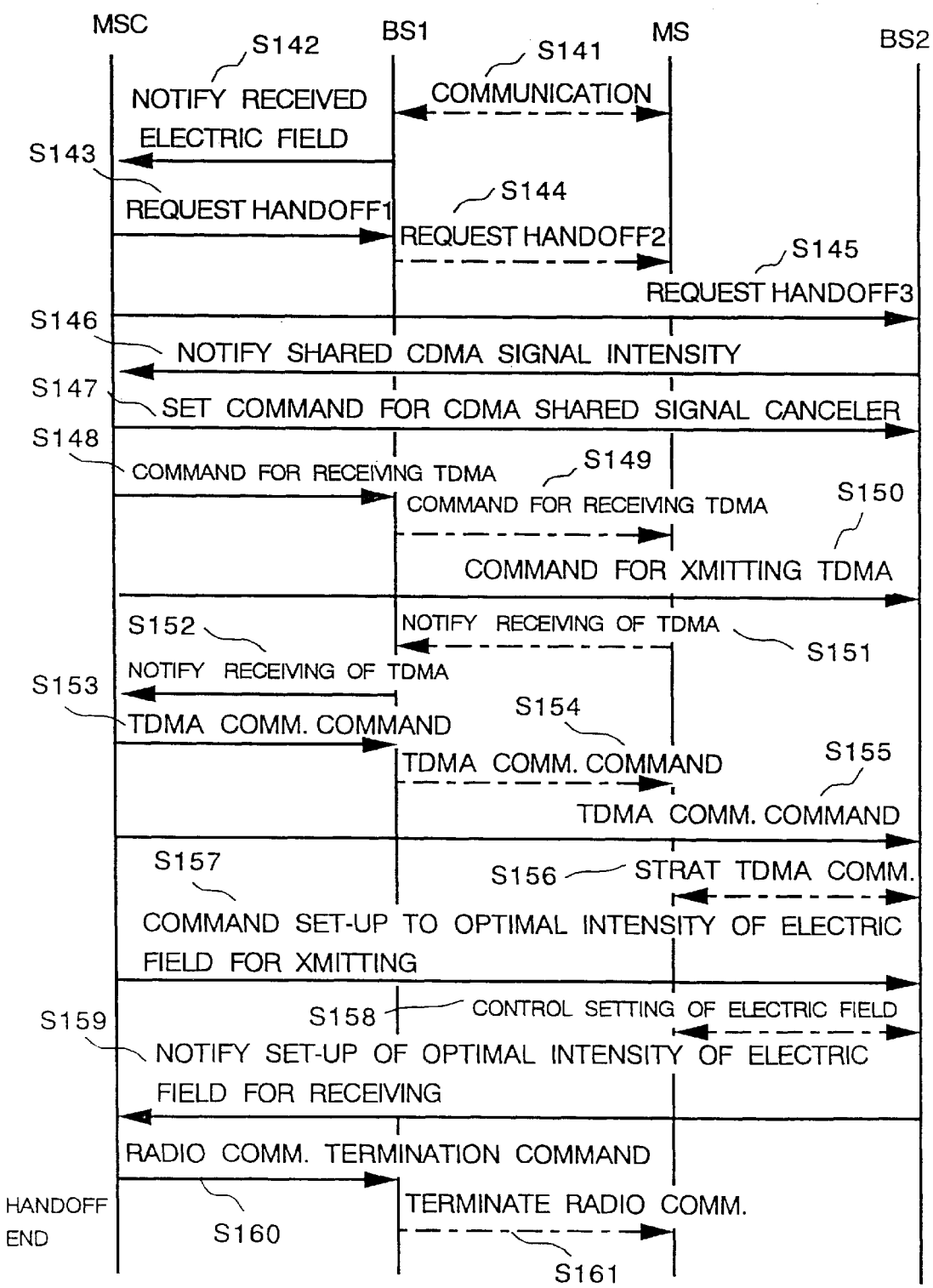
FIG. 22 is explaining a handoff process for the embodiment 4.

FIG. 21 is illustrating a handoff sequence flow chart of TDMA signal frequency sharing and time slot sharing with time divided CDMA signal. FIG. 22 is illustrating a handoff process of TDMA signal frequency sharing and time slot sharing with time divided CDMA signal. Step S121 of FIG. 21 and steps S141 and S142 of FIG. 22 determines the handoff destination of mobile station 1 (MS1) which is the base station 4 (BS2), that is, a situation when geographical closeness is identified between base station 4 (BS2) and mobile station 1 (MS1), and which communication channel the handoff is made clear remains unknown. First of all, state of shared signal of base station 4 (BS2) is measured, particularly on the state of electric wave for CDMA shared signal (step S122 of FIG. 21 and step S145 of FIG. 22) Previously mentioned FIG. 20 is control table of sharing the measured result based on the measuring process.

Moving now to an explanation of setup process of the shared signal cancelers (the shared signal removing units) which is the characteristic of the mobile communication system for the embodiment 4. At steps S123 and S124 of FIG. 21 (or step S147 of FIG. 22) the shared signal cancelers CDMA1C and CDMA2C are set at the base station4 (BS2) for communication channels 1018 and 1019. The state is shown in FIG. 20 on the column of shared signal canceler. Currently, the shared CDMA signal transmissions between the base station 4 (BS2) and two mobile stations which is connected through communication channels 1018 and 1019 are already occupied. In addition to that when these signals are being demodulated at the desired signal receiver of base station 4 (BS2), and if transmission in the communication channel 1015 occurs, the two communication channels 1018 and 1019 move from the state of processing at the desired signal receiver to the state of processing at the shared signal canceler.

Due to the decline in a level of shared signals resulting from the operation at the shared wave canceler of the base station 4 (BS2), a noise level of the desired signals (communication channel 1015 or 1010 in this case) or a level of the interference signals decrease. These can reduce the information error and decrease the transmission power of mobile station 1 (MS1).

Step S125 of FIG. 21 (or steps S148, S149 and S150 of FIG. 22) will now be explained. The mobile switching center sends a command control signal to the mobile station 1 (MS1) and the base station 4 (BS2) simultaneously then connects the base station 4 (BS2) with mobile station 1 (MS1) with TDMA signal for the first time to commence the TDMA communication with the handoff destination. Step S156 of FIG. 22 is showing a state of starting this communication.

After that, between the base station 4 (BS2) and mobile station 1 (BS1) the mobile switching center adjusts power of transmitters so that the respective receivers can reach an optimal electric field strength for receiving (steps S157 and S158 of FIG. 22). After that, the base station 4 (BS2) informs the respective transmitting powers and electric field strengths for receiving to the mobile switching center. Then the mobile switching center completes communication between the base station 3 (BS1) and the mobile station 1 (MS1) (the radio channel is still connected). Thus in this example, radio channel is connected between mobile station 1 (MS1) and two base stations 3 (BS1) and 4 (BS2) from a point of starting the TDMA communication (step S156 of FIG. 22) to a point of the connection termination command (step S161 of FIG. 22). On the otherhand, from step S126 to S129 of FIG. 21, in addition to the case described as of above, a case of obtaining a result of trial and error for TDMA signal at handoff destination is also included.

Figure 23:
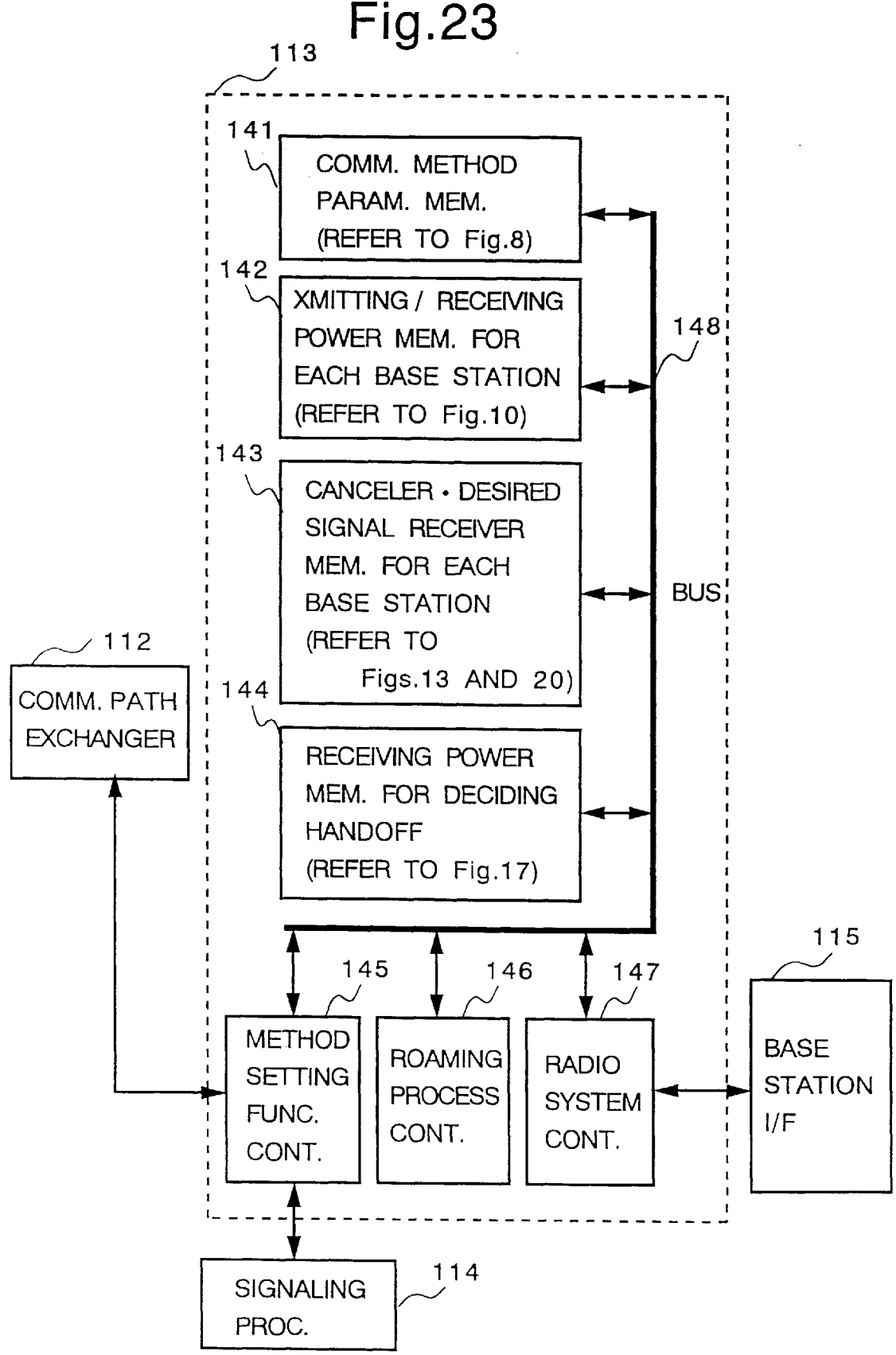
FIG. 23 is a block chart of the method setting processor inside the mobile switching center for the embodiment 4.

FIG. 23 is a block chart of method setting processors 113 at the mobile switching center related to the handoff. The handoff sequence and process of FIGS. 21 and 22 are implemented by a roaming process control unit 146. The roaming process control unit 146 commences the processing based on the instruction from a receiving power memory for handoff 144 (memory which stores control table of receiving power information for deciding handoff as shown in FIG. 17). The actual process starts by periodical access of data information inside the receiving power memory for handoff 144 by the roaming process control unit 146. Further, a radio system control unit 147 performs recording control of related information for the receiving power memory for handoff 144.

The embodiment 4 thus described, the configuration is effective in implementing handoff from a time divided CDMA signal to the TDMA signal that are sharing time slot and frequency sharing with the time divided CDMA signal. Transmission power level of communication signal between base stations and mobile station is administrated at the method setting processor inside the mobile switching center, therefore, within the cell of communication system sharing frequency channel and time slot for TDMA, CDMA and FDMA signals, the handoff from a time divided CDMA signal to TDMA signal sharing frequency and time slot with the time divided CDMA signal is implemented effectively. Embodiment 5.

Figure 24:
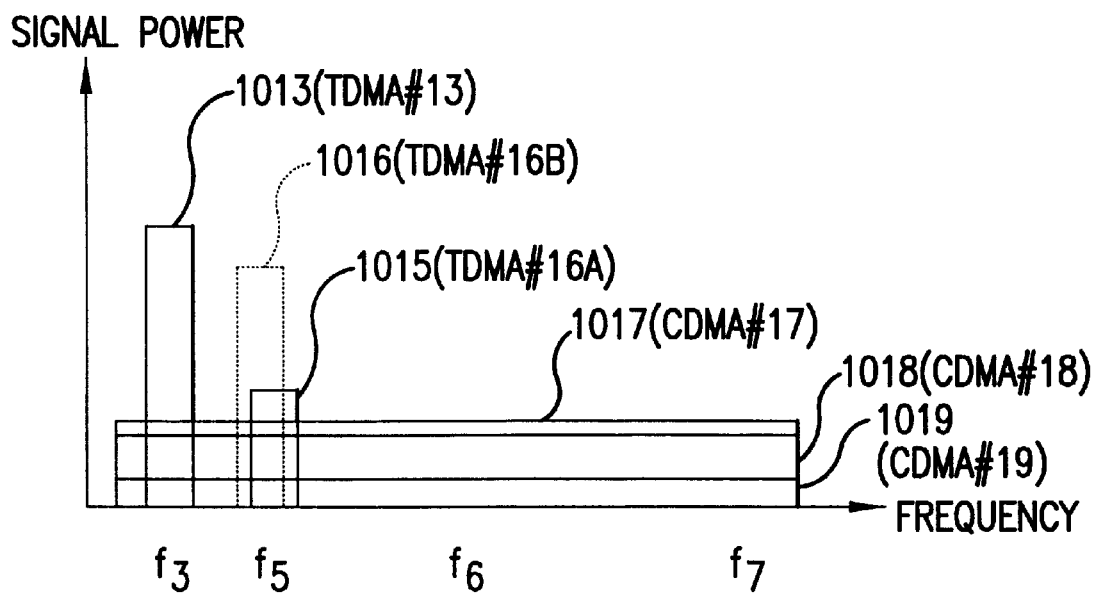
FIG. 24 is a frequency spectrum of frequency sharing communication signal received at the base station for the embodiment 5.

The mobile communication system of embodiment 5 according to this invention is described below. The embodiment 5 is related to handoff process (step S112 of FIG. 18) of TDMA signal identified by synchronization word code which is frequency sharing and time slot sharing with TDMA signal which is currently being transmitted. If step S112 is selected as a result of handoff sequence in FIG. 18, a case when the handoff destination base station 4 (BS2) is communicating, the step starts off with checking the TDMA signal which is frequency sharing and time slot sharing with time divided CDMA signal by the currently communicating mobile station 1 (MS1). FIG. 24 is frequency spectrum of communication signal received at the base station 4 (BS2) for the embodiment 5. The dotted line of communication channel 1016 indicates the channel is vacant. The frequency spectrum shown in FIG. 24 is indicating a situation where an input signal to the receiver stored in the memory of base station 4 (BS2) before commencing handoff. Corresponding to the situation of FIG. 24, FIG. 25 is showing a control table of operational control information for the shared signal canceler and the desired signal receiver of base station 4 (BS2) stored in the memory inside the method setting processor 113 for the embodiment 5. The classification of classes in the electric field strength for receiving is same as FIG. 10. The communication channel 1016 is TDMA signal assigned to the base station 4 (BS2), however, currently there is no call and is showing a vacant channel.

Figure 26:
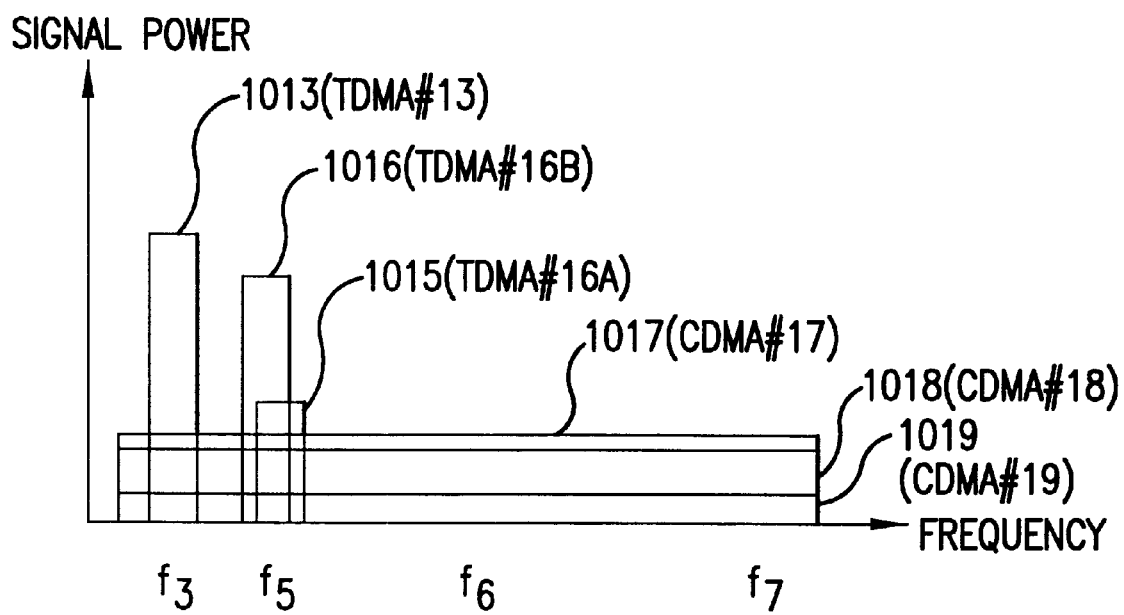
FIG. 26 is a frequency spectrum of frequency sharing communication signal received at the base station for the embodiment 5.

The base station 4 commences connection with the mobile station 1 through the communication channel 1016. Both the mobile station 1 (MS1) and the base station 4 (BS2) are said to have an interference canceler receiving function which is illustrated on FIG. 6 as 100. FIG. 24 is frequency spectrum of communication signal received at the base station 4 (BS2) for the embodiment 5. Corresponding to the situation in FIG. 26, FIG. 27 is showing a control table of operational control information for the shared signal canceler and the desired signal receiver stored in the memory of base station 4 (BS2) inside the method setting processor for the embodiment 5. The classification of classes in the electric field strength for receiving is same as FIG. 10.

Figure 28:
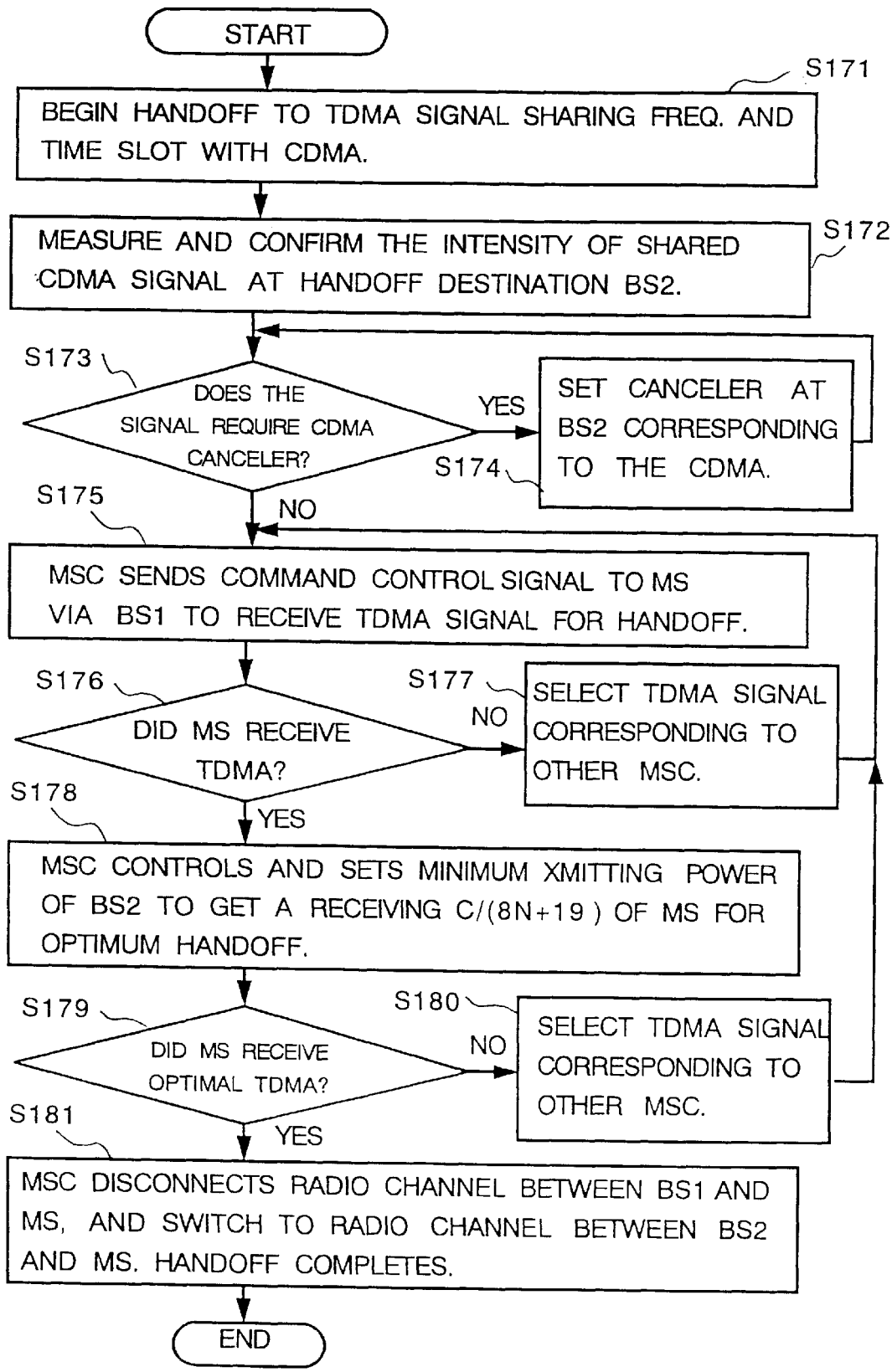
FIG. 28 is a flow chart of handoff sequence for the embodiment 5.
Figure 29:
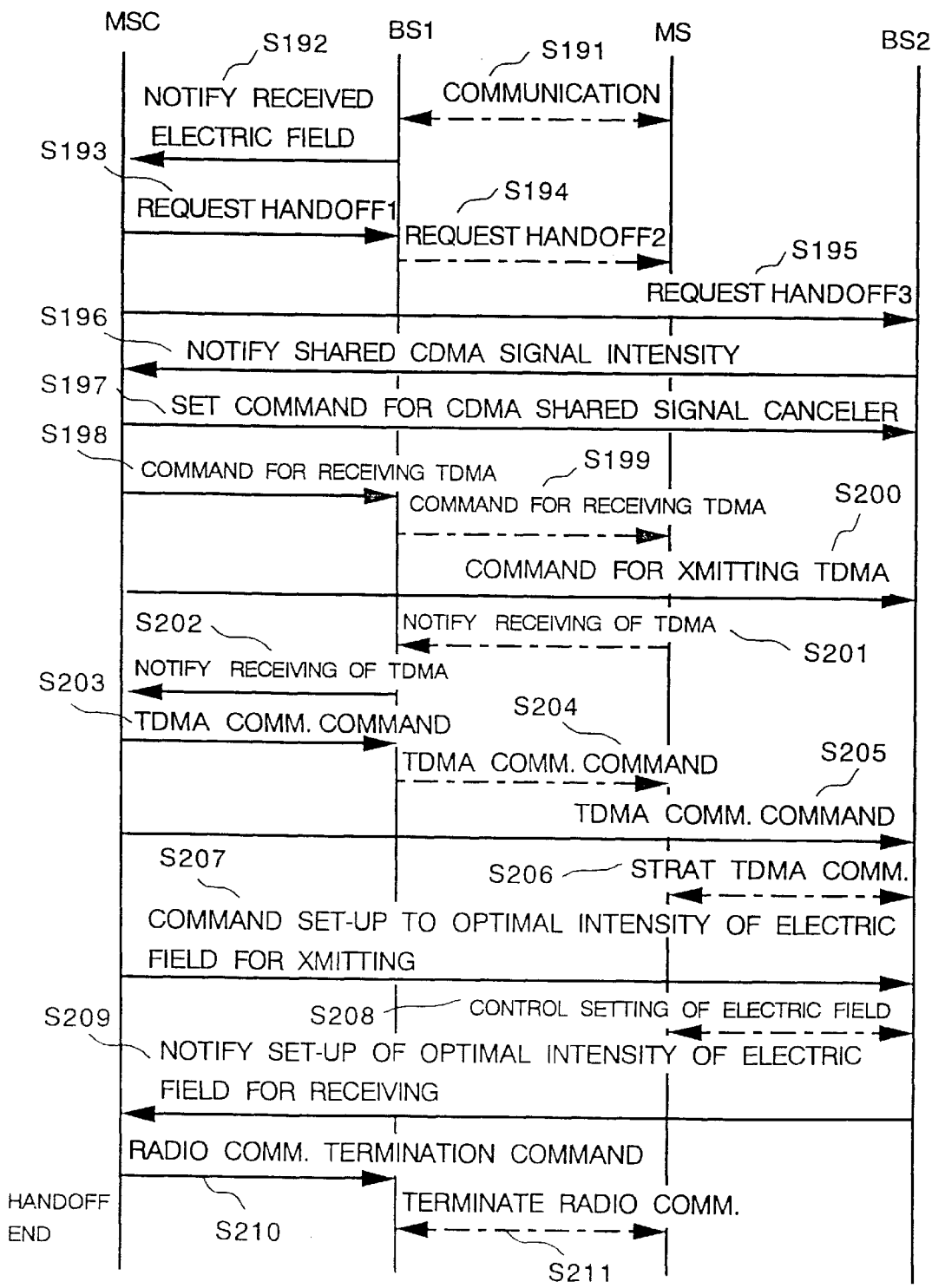
FIG. 29 is explaining a handoff process for the embodiment 5.

FIG. 28 and FIG. 29 illustrate handoff sequence flow chart and handoff process of TDMA signal (identified by synchronization word code) which is frequency sharing and time slot sharing with the TDMA signal mentioned above. In step S171 of FIG. 28 and steps S191 and S192 of FIG. 29 where the handoff destination base station 4 (BS2) of the mobile station 1 (MS1) is decided, in addition, which handoff communication channel to use is determined. However, for the time divided CDMA signal which is frequency sharing and time slot sharing with TDMA signal which is communicating, that is, shared signal for CDMA is still unknown. Therefore, a shared signal of the base station 4 (BS2) especially the state of electrical field of the CDMA shared signal is measured (step S172 of FIG. 28 and step S196 of FIG. 29). The previously described FIG. 25 is measured result based on the measuring process mentioned above.

Now moving on to the setting process of shared signal canceler (shared signal removing unit), which is the characteristic of the mobile communication for the embodiment 5. Further, for the embodiment 5 where there is TDMA shared signal, the characteristic lies where the shared signal cancelers are set for both the shared CDMA signal and the shared TDMA signal.

The different point to note from the embodiment 4 is clearly explained below. The CDMA canceler for embodiment 4 performs canceling of the CDMA shared signal from a situation where TDMA signal is frequency sharing and time slot sharing with the time divided CDMA signal or CDMA signal. On the other hand, in the embodiment 5 there are a CDMA signal canceler and a TDMA signal canceler. The CDMA canceler has an exactly same operation with the previously described CDMA canceler for embodiment 4.

The other canceler, the TDMA canceler has a function to remove one of the TDMA signals under a situation when the two TDMA signals are sharing same frequency and time slot, namely one of communicating TDMA signal with the base station 3 (BS1) and TDMA signal with different synchronization word code, is selected for removal after canceling the time divided CDMA signal or CDMA shared signal. The remaining TDMA signal is the desired signal, however, since the removed TDMA signal is also outputted from the TDMA canceler, meaning two types of TDMA signal information is outputted from this canceler, and the two TDMA signals are having different synchronization word codes. To distinguish the TDMA canceler of this embodiment from the one in embodiment 4, the described TDMA canceler is termed "TDMA canceler identified by synchronization word codes". For such "TDMA canceler identified by synchronization word codes" to be incorporated into the mobile station and base station, a block illustrated in FIG. 6 as 100 is suitable.

In steps S173 and S174 of FIG. 28 (or step S197 of FIG. 29), the CDMA cancelers CDMA1C and CDMA2C are provided at the base station 4 (BS2) for communication channels 1018 and 1019. FIG. 25 illustrates the situation on the shared signal canceler column. As can be seen from this column, the communication channels 1018 and 1019 which are CDMA signals are currently occupied between the base station 4 (BS2) and the two mobile stations, in addition, when these signals are being demodulated by the desired signal receiver of the base station 4 (BS2), and if communication channel 1015 occurs, the two communication channels 1018 and 1019 move from the state of processing at the desired signal receiver to the state of processing at the shared signal.

The "TDMA signal identified by synchronization word codes" is set at the base station 4 (BS2) That is, the canceler equivalent to 100 of FIG. 6 having synchronization word code SyW2 is set for the communication channel 1016 of FIG. 25. Two desired signals of #16A (communication channel 1015) and #16B (communication channel 1016) are outputted from this canceler. For setting to the mobile station, since only one signal is used, the canceler can be referred to as just "canceler", however when setting to the base station as in FIG. 6, both signals are used as information so that referring it to as just "canceler" is not appropriate. For the reason of convenience, this specification shall use a name "TDMA canceler identified by synchronization word code".

As can be seen for the base station 4 (BS2), due to a decline in the level of shared signal resulting from the operation of shared wave canceler, the noise level or interference level of desired signal (for this case communication channels 1015 or 1013) will decline to reduce the error rate of information, otherwise diminish the transmitting power of the mobile station 1 (MS1).

In step S175 of FIG. 28 (steps S198, S199 and S120 of FIG. 29) the mobile switching center simultaneously generates the command control signals to mobile station 1 (MS1) and base station 4 (BS2) to begin TDMA communication with the handoff destination by connecting the base station 4 (BS2) and the mobile station 1 (MS1) for the first time using TDMA signal identified by synchronization word codes having two different codes. Step S206 of FIG. 29 indicates the situation after commencing this communication.

After this step, between the base station 4 (BS2) and the mobile station 1 (MS1), the mobile switching center adjusts receiving power of to achieve the optimum receiving electric field strength at each receiver (steps S207 and S208 of FIG. 29). After this step, the base station 4 (BS2) informs the receiving power intensity and receiving power of each receiver to the mobile switching center to complete the communication between base station 3 (BS1) and mobile station 1 (MS1) For this example, therefore, is illustrating a case when the mobile station 1 (MS1) is on radio connection between the two base stations 3 (BS1) and 4 (BS2) from the commencing of TDMA communication (step S206 of FIG. 29) to the completion of connection termination command (step S211 of FIG. 29). On the other hand, in addition to the case above, the case also includes obtaining trial and error of TDMA signal at handoff destination from step S176 to S179 of FIG. 28.

The embodiment 5 of the invention thus described, the configuration is effective in implementing handoff from time divided CDMA signal sharing frequency and time slot sharing with TDMA signal wherein the method setting processor of the mobile switching center to control transmitting power level of communication signal at the base stations and mobile station, therefore, in the cell of communication system where TDMA, CDMA and FDMA signals are sharing frequency channel and time slot. In addition, in this embodiment, because it is possible to receive two separate TDMA signals sharing time slot and frequency, and this is extremely advantageous in using frequency effectively.

Embodiment 6.

Figure 30:
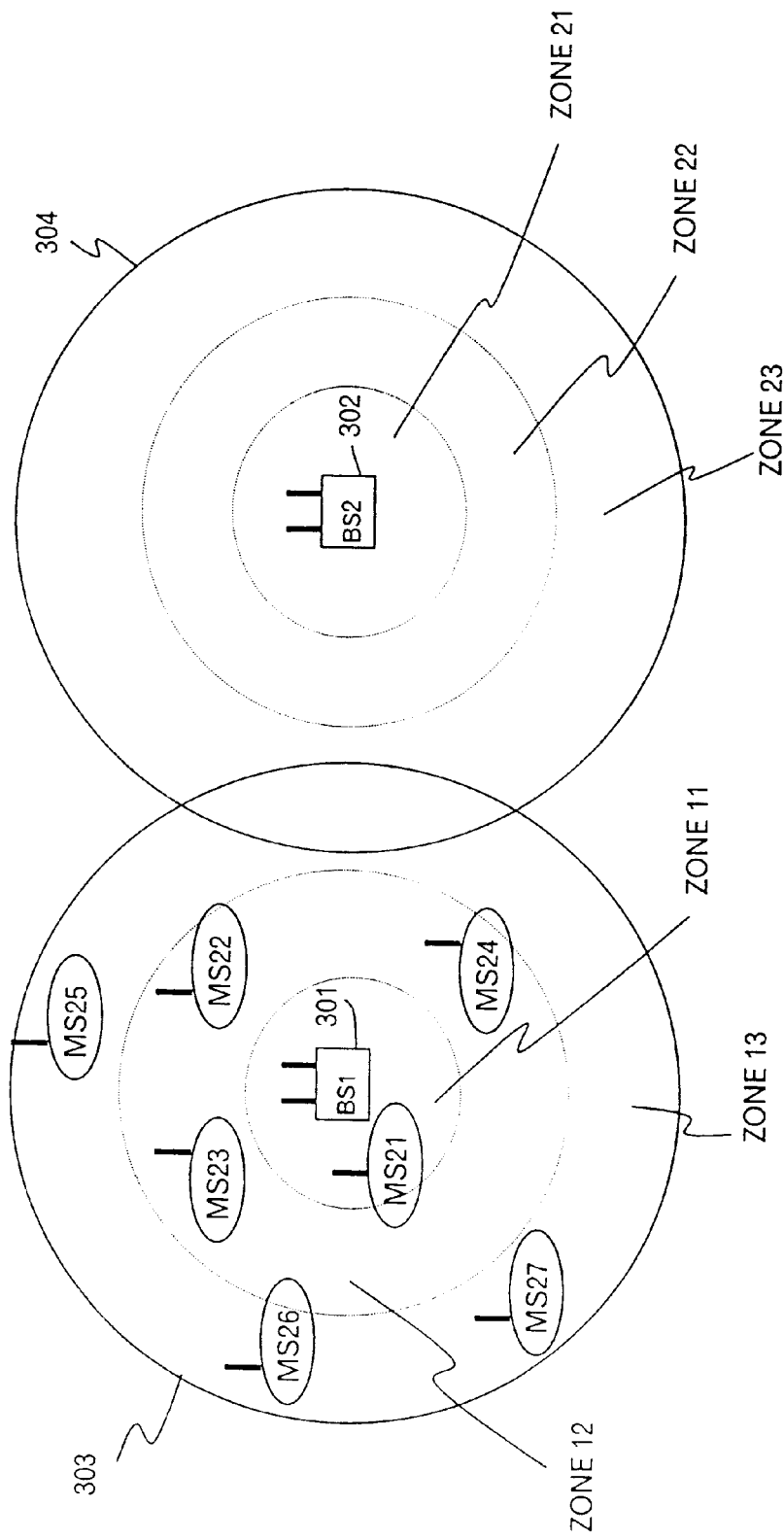
FIG. 30 is a configuration of zones in the mobile communication system for the embodiment 6.
Figure 31:
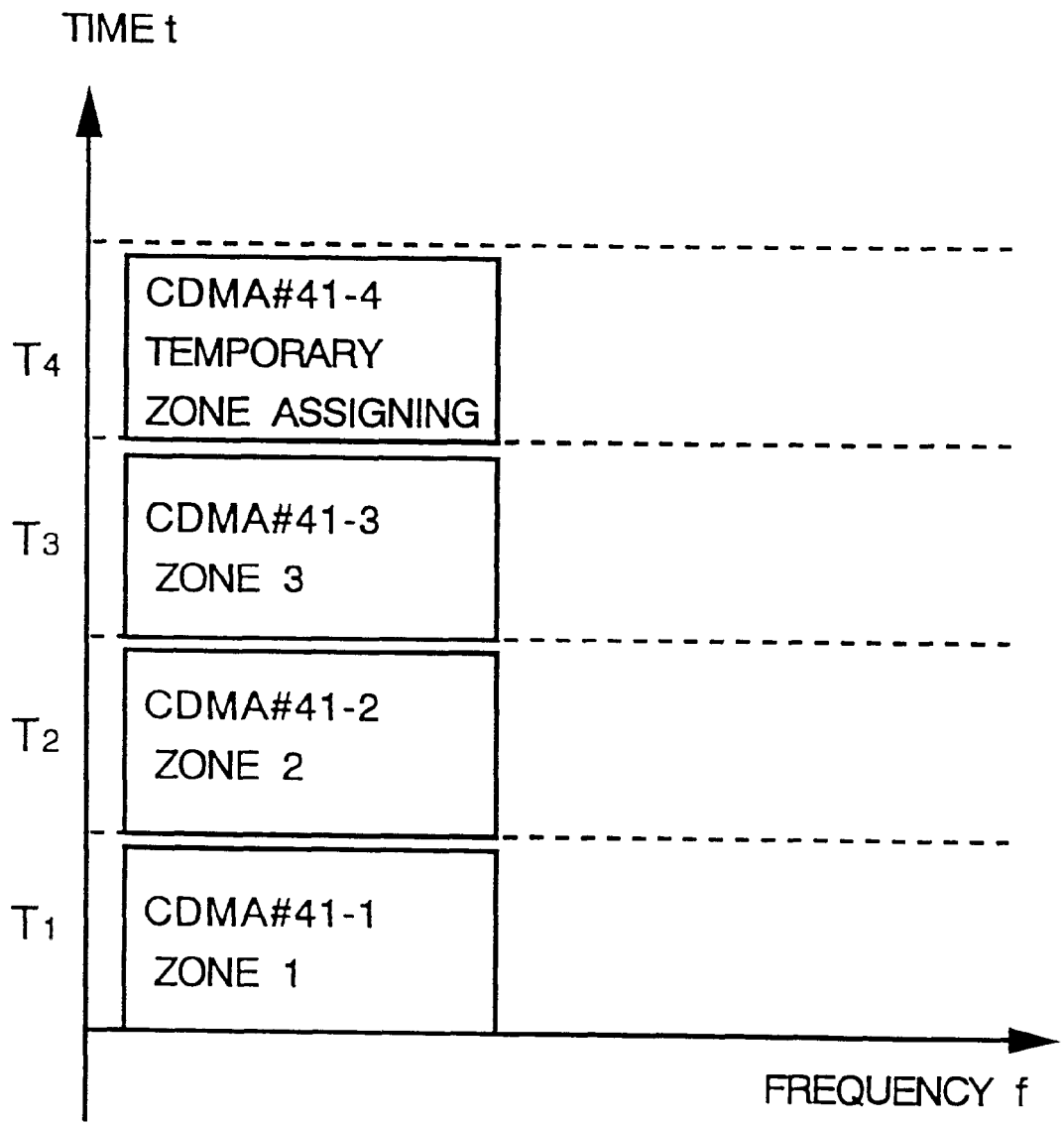
FIG. 31 is explaining a relationship between frequency spectrum and time slot for the communication signal.
Figure 32:
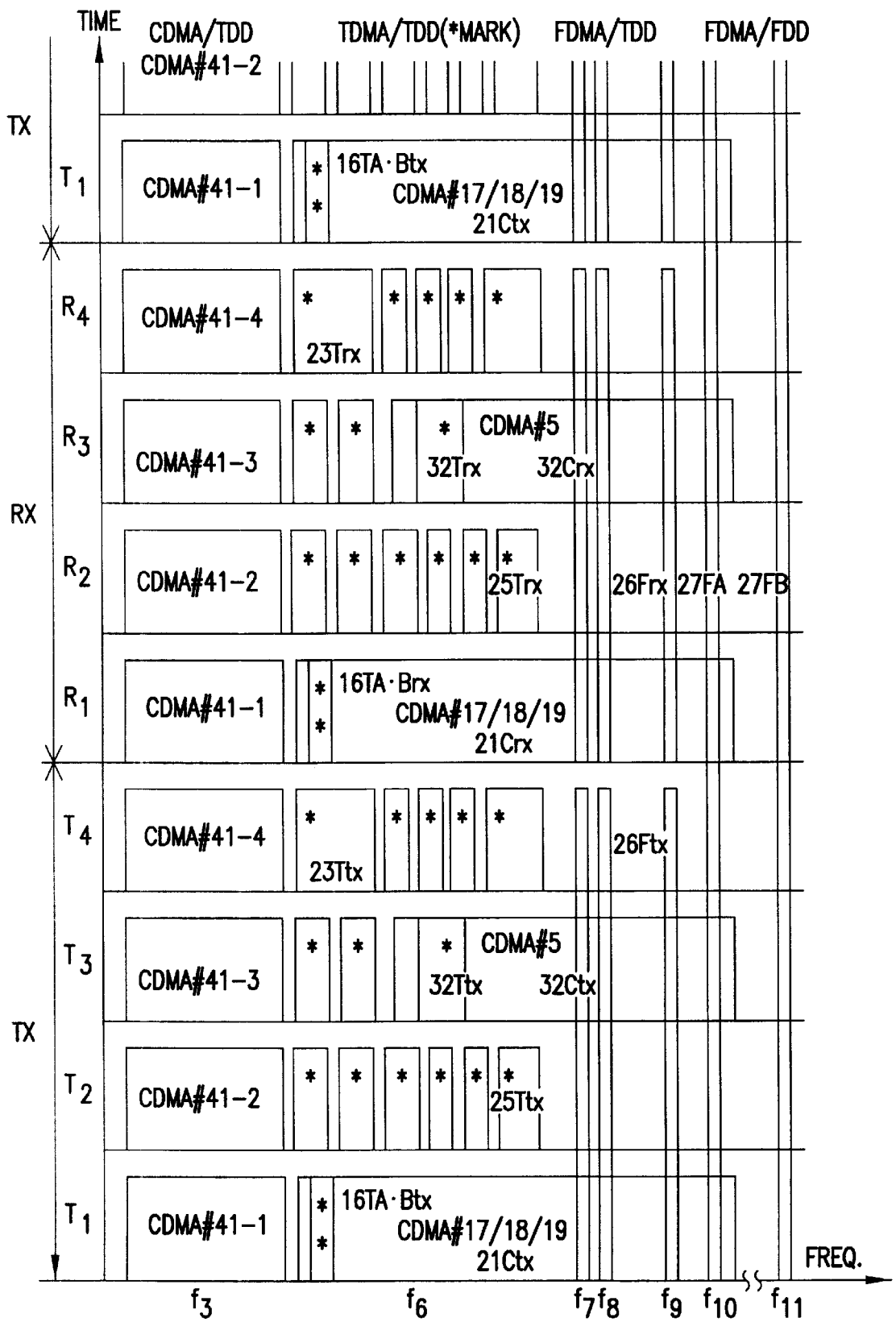
FIG. 32 is a detailed chart explaining a relationship between the frequency spectrum and the time slot of communication signal for the embodiment 6.

The mobile communication system of embodiment 6 according to this invention is described below. FIG. 30 illustrates a cell structure made of a plurality of concentric circle zones for the embodiment 6. The characteristic of the cell structure is the corresponding orders of concentric zones and time divided CDMA signal and TDMA signal. These corresponding orders are shown in FIG. 31. FIG. 32 explains in detail the relationship between a frequency spectrum of the frequency sharing and time slot sharing of communication signal and a time slot for the embodiment 6.

For FIG. 30, a transmitting power from base station BS1 to mobile station MS21 situated in zone 11 is smaller than the transmitting power from the base station BS1 to mobile station MS25 in zone 13 (situated farther from BS1 than the zone 11). Thus, when time divided CDMA signals from the both are assigned at the same time slot, masking of a down-link channel with smaller transmitting power takes place with the one with larger transmitting power. That is, for those signals with smaller transmitting power, sharing with signal with larger transmitting power is equivalent to increase in the noise. For the required signal, it is desirable to avoid obstruction by other signal. As the FIGS. 31 and 32 are showing, previously mentioned masking can be avoided by assigning signal with smaller transmitting power to the mobile station MS21 situated at zone 11 from the base station BS1 to time slot CDMA#41-1 of time divided CDMA signal, and by assigning signal with larger transmitting power to mobile station MS25 situated at zone 13 from the base station BS1 to time slot CDMA#41-3.

FIG. 33 is control table of information on transmitting power and position of mobile station stored in the memory of method setting processor, corresponding to the situation of FIG. 30 for the embodiment 6. The classification of classes for the electric field strength for receiving and the transmitting power are same as in FIG. 10. In FIG. 33, for example, this mobile station MS21 assigned to a communication channel 1021 is situated in zone 11, and its transmitting power is minimum of the classes which is 1. For mobile station MS27 assigned to other communication channel 1027 is situated in zone 13, and its transmitting power is the maximum of the classes which is 3.

FIG. 34 is control table of information on transmitting/receiving powers and mobile station position which are the control data stored inside the memory of method setting processor 113, corresponding to the situation of FIG. 30 for the embodiment 6. The classification of classes for the electric field strength for receiving and the transmitting power are same as in FIG. 10. In FIG. 33 when the mobile station MS27 assigned to communication channel 1027 is situated in zone 13 (refer to FIG. 30), and its transmitting power is class 3 which is the maximum class as shown in FIG. 33. When a number of mobile stations with transmitting power class 3 inside the zone 13 increase that a required C/N (carrier to noise) of the signal can no longer be obtained, then assigned time slot for one of the number of mobile stations is changed to time slot T4 of FIG. 31, that is to CDMA#41-4. By doing so, signal can obtain the required C/N. For communication channel 1027 of FIG. 34, the position of mobile station is zone 13, and indicates that the time slot is 4. In this case, by changing the time slot, masking of smaller signals can be avoided, as well as avoiding excess assigning of communication channels to the same time slot can be avoided.

The embodiment 6 thus described, for signals with larger transmitting power transmitted from the base station to the mobile station which is positioned at an outer zone far from a center of the cell, the configuration is effective in avoiding saturation of receiver at mobile station situated at an inner zone from the pre-mentioned outer zone. Spreading of communication channel time slot for mobile station situated at a zone of high density of mobile stations enables prevention of C/N deterioration. The intensity of input signal for receiving at base station are suppressed equally for any of the uplink signals transmitted from mobile stations of any of the zones. This prevents occurrence of circumstance where only a particular signal is possible for communication and all others are not possible for communication.

Embodiment 7.

Figure 35:
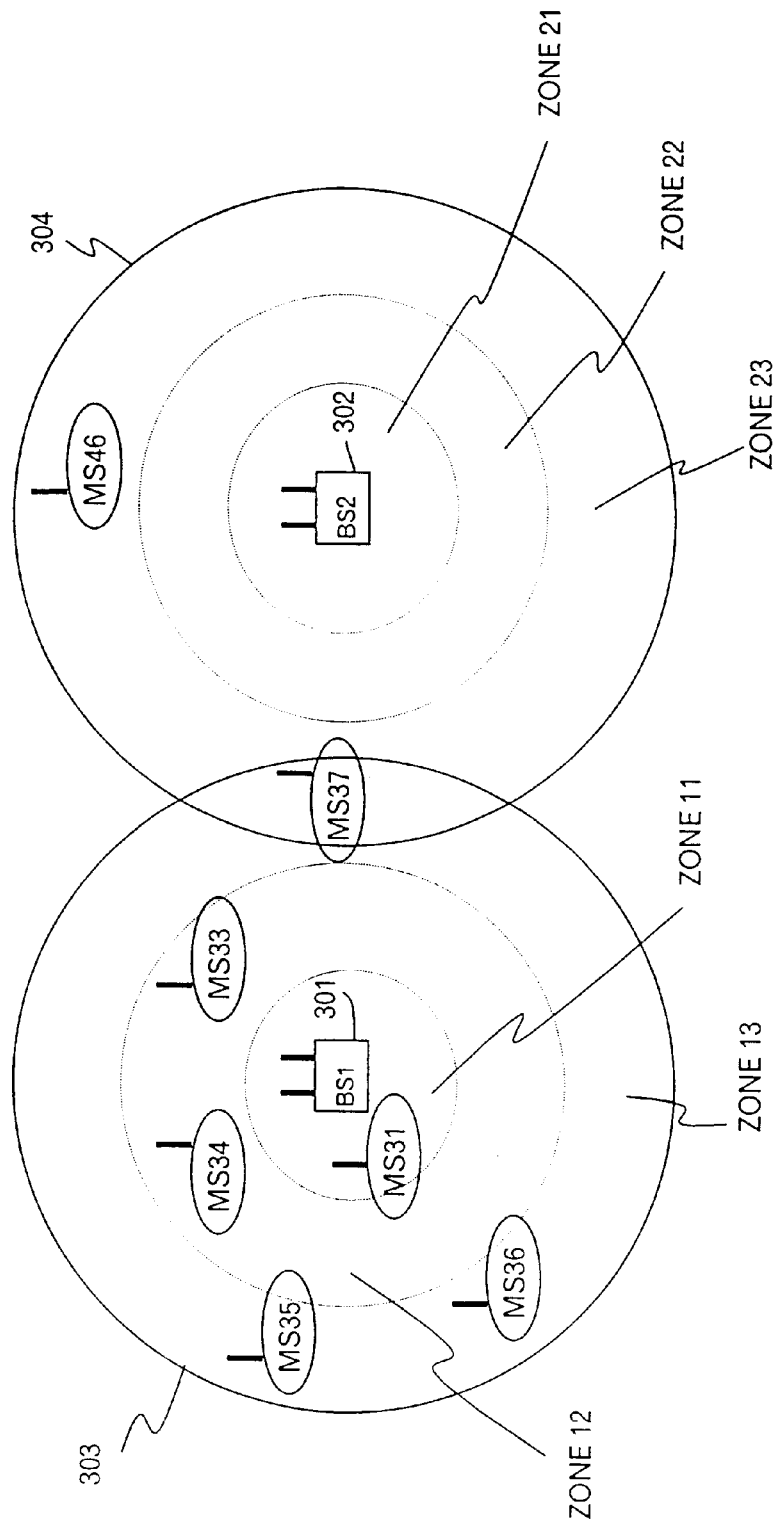
FIG. 35 is a control table of radio method parameters for the embodiment 7.
Figure 36:
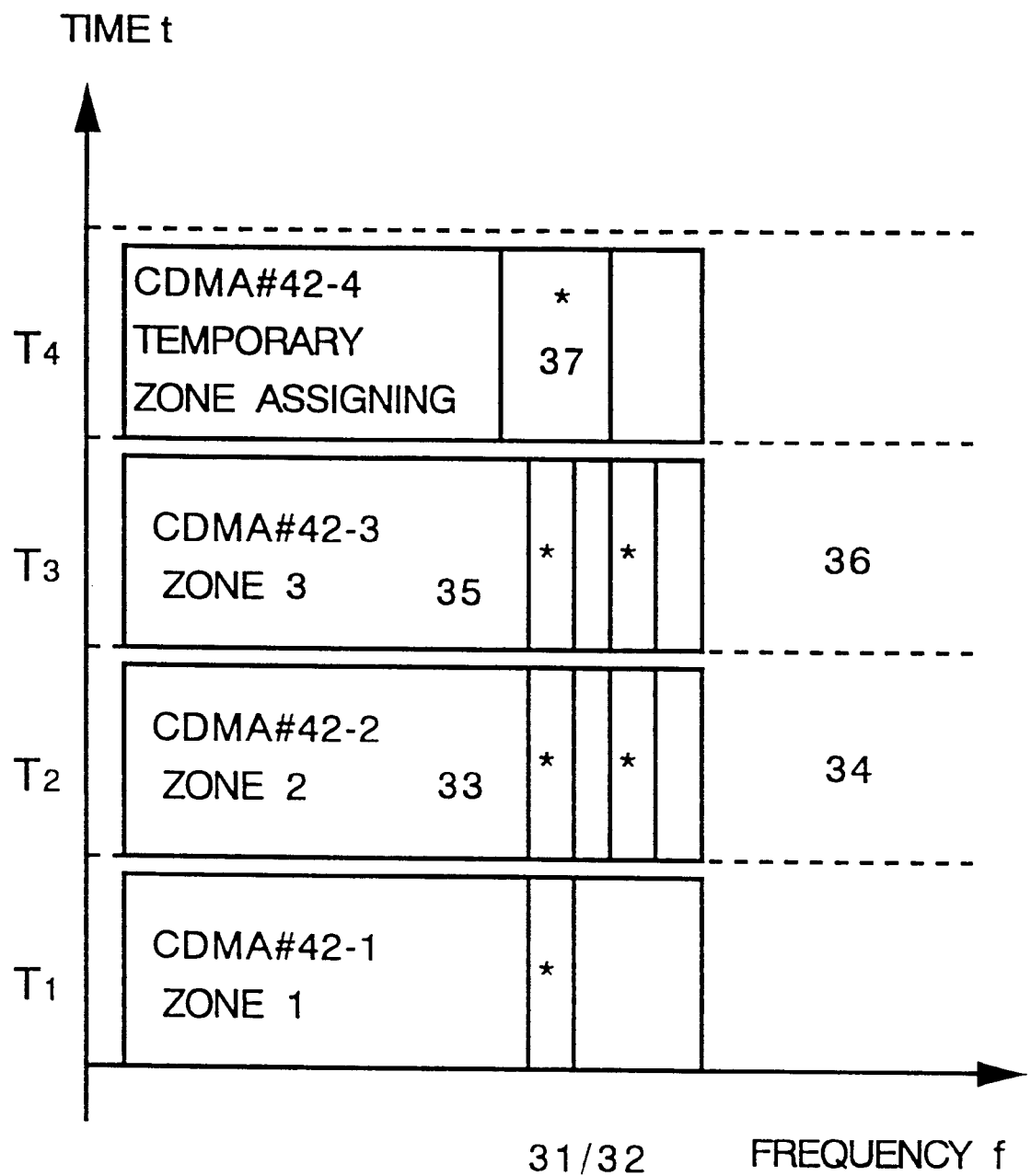
FIG. 36 is a configuration of zones in the mobile communication system for the embodiment 7.
Figure 37:
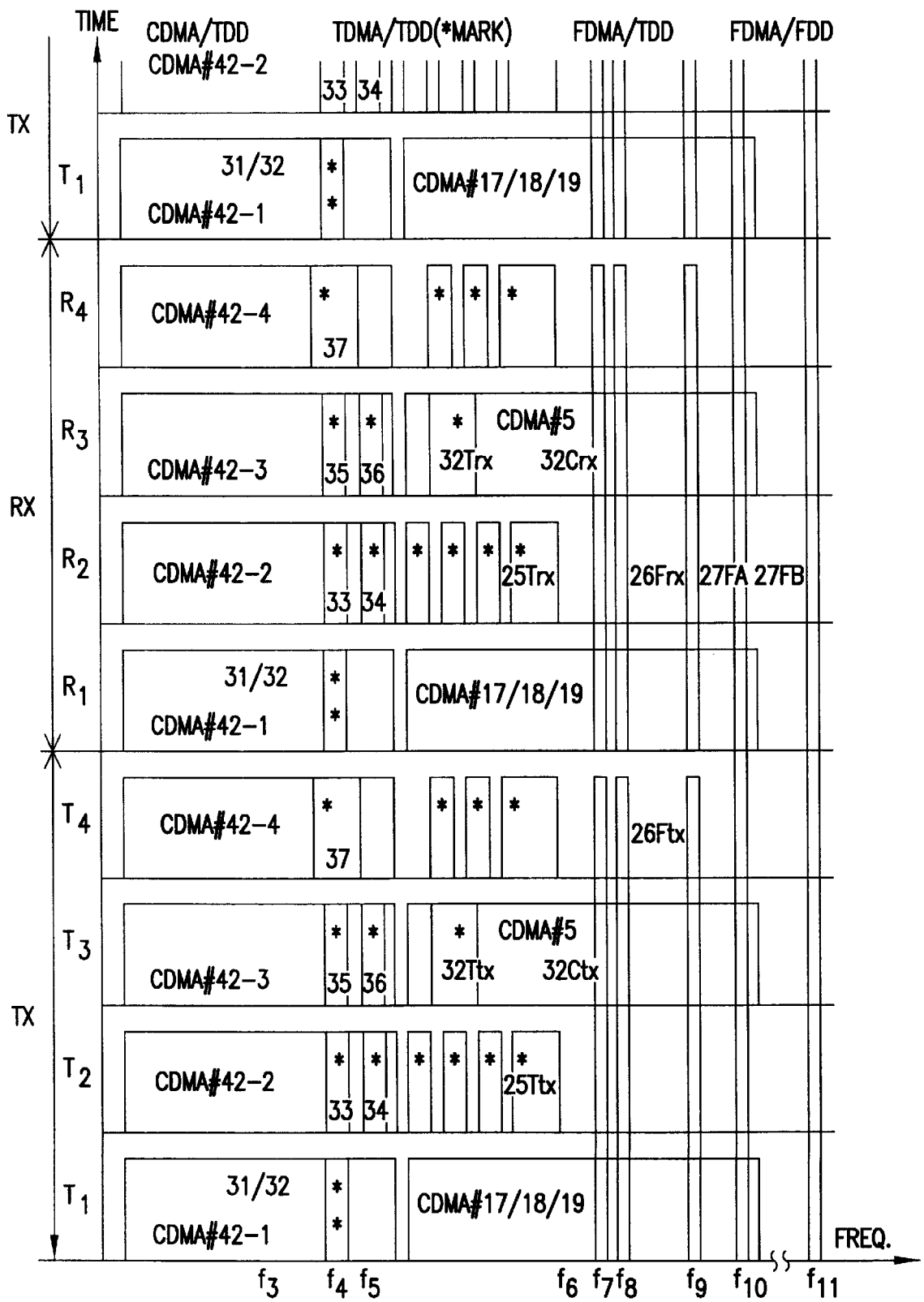
FIG. 37 is a chart explaining a relationship between the frequency spectrum and the time slot of communication signal for the embodiment 7.

The mobile communication system of embodiment 7 according to this invention is described below. FIG. 35 illustrates a cell structure made of a plurality of concentric circle zones for the embodiment 7. The characteristic of the cell structure is the corresponding orders of concentric zones and time slot of time divided CDMA signal and TDMA signal. The corresponding orders are shown in FIG. 36. FIG. 37 explains in detail the relationship between a frequency spectrum of the frequency sharing and time slot sharing of communication signal and a time slot for the embodiment 7.

In FIG. 35, the mobile station for TDMA is displayed only. However, the mobile station for time divided CDMA illustrated in FIG. 30 is simultaneously communicating within the cell 303.

In FIG. 35, the transmitting power from the base station BS1 to the mobile station MS21 for performing time divided CDMA communication which is situated in zone 11 (refer to FIG. 30) is smaller than the transmitting power from the base station BS1 to the mobile station MS35 for performing TDMA communication which is situated in zone 13 (refer to FIG. 35). Zone 13 is situated farther from the base station BS1 than the zone 11. Thus, when time divided CDMA signals from the both are assigned at the same time slot, masking of a down-link channel with smaller transmitting power takes place with the one with larger transmitting power. (The CDMA receiver diffuses TDMA signal within the same frequency bandwidth. At an input terminal of receiving information detector the diffused TDMA signal is equivalent to a noise for the CDMA signal). That is, for those signals with smaller transmitting power, sharing with signal with larger transmitting power is equivalent to increase in the noise. For the required signal, it is desirable to avoid obstruction by other signal. As the FIGS. 36 and 37 are showing, previously mentioned masking can be avoided by assigning signal with smaller transmitting power to the mobile station MS21 situated at zone 11 from the base station BS1 to time slot CDMA#42-1 of time CDMA signal, and by assigning signal with larger transmitting power to mobile station MS35 situated at zone 13 from the base station BS1 to time slot CDMA#42-3.

FIG. 38 is control table of information on transmitting power and position of mobile station stored in the memory of method setting processor, corresponding to the situation of FIG. 35 for the embodiment 7. The classification of classes for the electric field strength for receiving and the transmitting power are same as in FIG. 10. In FIG. 38, for mobile stations MS21~MS27 which performs time divided CDMA communications and mobile stations MS31~MS37 which performs TDMA communications, the relationship of position of each zone, and transmitting power and receiving signal intensity is illustrated. For example, the mobile station MS31 assigned to a communication channel 1031 is situated in zone 11, and its transmitting power is minimum of the classes which is 1. For the mobile station MS35 assigned to the other communication channel 1035 is situated in zone 13, and its transmitting power is the maximum of the classes which is 3.

Communication channel 1037 of FIG. 38 illustrates the other examples for the embodiment 7. In FIG. 35, mobile station MS37 performing TDMA communication assigned to the communication channel 1037 is situated at zone 13, and its receiving power is maximum of class 3 as shown in FIG. 38. When a number of mobile stations performing the TDMA communications or the time divided CDMA communications with transmitting power class 3 inside the zone 13 increase that a required C/N of the signal can no longer be obtained, then assigned time slot for one of the number of mobile stations is changed to time slot T4 of FIG. 31, that is to CDMA #42-4. By doing so, signal can obtain the required C/N. For communication channel 1037 of FIG. 38, the position of mobile station is zone 13, and indicates that the time slot is 4. In this case, by changing the time slot, masking of smaller signals can be avoided, as well as excess assigning of communication channels to the same time slot can be avoided. The embodiment 7 thus described, for the time divided CDMA signal and TDMA signal of mobile communication system which are sharing frequency channel and time slot, the larger the transmitting power transmitted from the base station to the mobile station which is positioned at an outer zone far from a center of the cell, the configuration is effective in avoiding saturation of receiver of mobile station situated at an inner zone from the pre-mentioned outer zone. Spreading of communication channel time slot for mobile station situated at a zone of high density of mobile stations enables prevention of C/N deterioration. The intensity of input signal for receiving at base station are suppressed equally for any of the uplink signals transmitted from mobile stations of any of the zones. This prevents occurrence of circumstance where only a particular signal is possible for communication and all others are not possible for communication.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile communication system for radio communication comprising:

a plurality of communication stations including a plurality of mobile stations and at least one base station, wherein mobile communication is performed between the stations with a communication signal using a predetermined access method selected from a plurality of frequency sharing or time sharing multiple access methods available to said communication system, wherein each of said communication stations includes:

a receiving unit for receiving a communication signal, said communication signal including a TDMA signal identified by a synchronization word code, said TDMA signal transmitted between two stations having a different synchronization word code from other TDMA signals assigned to the same frequency and time slot, based on a TDMA method and a time divided CDMA signal, frequency spread by a spread code and being assigned to a time division time slot, based on a CDMA method;

a shared signal regeneration unit for regenerating the time divided CDMA signal from the received communication signal and for outputting said time divided CDMA signal as a shared signal;

a shared signal removing unit for removing the shared signal from the received communication signal; and a desired signal regeneration unit for regenerating said TDMA signal after removal of the shared signal from the received communication signal and for outputting said TDMA signal as a desired signal.

2. A mobile communication system for radio communication comprising:

a plurality of communication stations including a plurality of mobile stations and at least one base station, wherein mobile communication is performed between the stations with a communication signal using a predetermined access method from a plurality of frequency sharing or time sharing multiple access methods available to said communication system, wherein each of said communication stations includes:

a receiving unit for receiving a communication signal, said communication signal including a TDMA signal identified by a synchronization word code, said TDMA signal transmitted between two stations having a different synchronization word code from other TDMA signals assigned to the same frequency and time slot, based on a TDMA method, and a time divided CDMA signal, frequency spread by a spread code and being assigned to a time division time slot, based on a CDMA method;

a shared signal regeneration unit for regenerating the TDMA signal from the receive communication signal and for outputting said TDMA signal as a shared signal;

a shared signal removing unit for removing the shared signal from the received communication signal; and a desired signal regeneration unit for regenerating said time divided CDMA signal after removal of the shared signal from the received communication signal and for outputting said time divided CDMA signal as a desired signal.

3. A mobile communication system for radio communication comprising:

a plurality of communication stations including a plurality of mobile stations and at least one base station, wherein mobile communication is performed between the stations with a communication signal using a predetermined access method from a plurality of frequency sharing or time sharing multiple access methods available to said communication system, wherein each of said communication stations includes:

a receiving unit for receiving a communication signal said communication signal including a TDMA signal identified by a synchronization word code, said TDMA signal transmitted between two stations having a different synchronization word code from other TDMA signals assigned to the same frequency and time slot, based on a TDMA method, and a time divided CDMA signal, frequency spread by a spread code and being assigned to a time division time slot, based on a CDMA method;

a base station control data memory unit for storing information for identifying said predetermined access method as control data showing a spreading code used in creating the time divided CDMA signal and a synchronization word code used in the TDMA signal, for the communication signal used within the service area of said a least one base station; and a base station access method control unit for controlling multiple access methods between a plurality of mobile stations an said at least one base station, based on said control data.

4. The mobile communication system of claim 3, wherein the base station access method control unit of claim 3 stores control data for each access method identified by information for identifying said predetermined access method showing said spreading code and said synchronization word code, and wherein the control data has information on transmitting/receiving powers related to transmitting power at said at least one base station, receiving power at said at least one base station, transmitting power at each of said plurality of mobile stations and receiving power at each of said plurality of mobile stations.

5. The mobile communication system of claim 4, wherein the system decides a handoff of the mobile station depending on a receiving power of a communication signal transmitted from a mobile station and received at a base station and a transmitting power of a communication signal transmitted from the base station to the mobile station at the mobile station, wherein, based on the decision, adjoining base stations from the base station receive communication signal from the mobile station; and wherein the system decides a handoff destination of the base station based on the receiving powers at the adjoining base stations.

6. The mobile communication system of claim 3 wherein the station has a plurality of shared signal regeneration units and a plurality of desired signal regeneration units corresponding to multiple access methods; and wherein the station stores a control data for each access method identified by method using information for identifying access method showing spreading code and synchronization word code, and wherein the control data includes operation information of each of the shared signal regeneration units and each of the desired signal regeneration unit.

7. The mobile communication system of claim 6, wherein the one of the shared signal regeneration unit and the desired signal regeneration unit corresponding to the multiple access method is assigned to the communication signal depending on receiving power of the communication signal transmitted from the mobile station and received at the base station.

8. The mobile communication system of claim 6, wherein the shared signal regeneration unit or the desired signal regeneration unit corresponding to the multiple access method is assigned to the communication signal depending on receiving power of the TDMA signal and the time divided CDMA signals at the handoff destination base station in case of making handoff to TDMA signal sharing frequency and time slot with time divided CDMA signal.

9. A mobile communication system for radio communication comprising:

a plurality of communication stations including a plurality of mobile stations and at least one base station, wherein mobile communication is performed between the stations with a communication signal using a predetermined access method from a plurality of frequency sharing or time sharing multiple access methods available to said communication system, wherein each of said communication stations includes:

a receiving unit for receiving a communication signal, said communication signal including a TDMA signal identified by a synchronization word code, said TDMA signal transmitted between two stations having a different synchronization word code from other TDMA signals assigned to the same frequency and time slot, based on a TDMA method, and a time divided CDMA signal, frequency spread by a spread code and being assigned to a time division time slot, based on a CDMA method;

a mobile switching center, connected to said at least one base station, for controlling the multiple access methods use in the mobile communication system, wherein the mobile switching center includes:

a system control data memory unit for storing information for identifying said predetermined access method as control data showing a spreading code used in creating the time divided CDMA signal and a synchronization word code used in the TDMA signal, for the communication signal used within the mobile communication system; and a system access method control unit for controlling multiple access methods between a plurality of mobile stations and said a least one base station within the mobile communication system, based on the control data.

10. The mobile communication system of claim 9, wherein the system access method control unit of claim 4 stores control data for each access method identified by information for identifying access method showing spreading code and synchronization word code, and wherein the control data has information on transmitting/receiving powers related to transmitting power at base station, receiving power at base station, transmitting power at mobile station and receiving power at mobile station.

11. The mobile communication system of claim 9, wherein the station has a plurality of shared signal regeneration units and a plurality of desired signal regeneration units corresponding to multiple access methods; and wherein the station stores a control data for each access method identified by method using information for identifying access method showing spreading code and synchronization word code, and wherein the control data includes operation information of each of the shared signal regeneration units and each of the desired signal regeneration unit.

12. A mobile communication system for radio communication comprising:

a plurality of communication stations including a plurality of mobile stations and at least one base station, wherein mobile communication is performed between the stations with a communication signal using a predetermined access method selected from a plurality of frequency sharing or time sharing multiple access methods available to said communication system, wherein each of said communication stations includes:

a receiving unit for receiving a communication signal, said communication signal including a TDMA signal identified by a synchronization word code, said TDMA signal transmitted between two stations having a different synchronization word code from other TDMA signals assigned to the same frequency and time slot, based on a TDMA method, and wherein the mobile stations perform communication with said at least one base station using said TDMA signal, and perform communication with an adjoining base station using a TDMA signal identified by a synchronization word code that has a different synchronization word code from the previously used TDMA signal, upon handoff of communication from said at least one base station to said adjoining base station.

13. A mobile communication system for radio communication comprising:

a plurality of communication stations including a plurality of mobile stations and at least one base station, wherein mobile communication is performed between the stations with a communication signal using a predetermined access method selected from a plurality of frequency sharing or time sharing multiple access methods available to said communication system, wherein each of said communication stations includes:

a receiving unit for receiving a communication signal, said communication signal including a TDMA signal identified by a synchronization word code, said TDMA signal transmitted between two stations having a different synchronization word code from other TDMA signals assigned to the same frequency and time slot, based on a TDMA method, and a time divided CDMA signal, frequency spread by a spread code and being assigned to a time division time slot, based on a CDMA method;

wherein the base station divides radio coverage of mobile communications into a plurality of concentric zones centered around the base station, wherein each of the concentric zones correspond to at least a time slot associated with one of: a TDMA signal, a TDMA signal identified by a synchronization word code, and a time divided CDMA signal, and wherein, when a mobile station situated inside the concentric zones of radio coverage and assigned a time divided communication signal having a time slot corresponding to a particular concentric zone moves to another concentric zone, the mobile station is assigned a time divided communication signal having a time slot corresponding to said another concentric zone.

14. The mobile communication system of claim 13, wherein when a mobile station is situated at an outermost one of the concentric zones, the mobile station performs handoff to an adjoining base station using a time divided communication signal having a time slot corresponding to the outermost concentric zone of radio coverage of said adjoining base station.

15. The mobile communication system of claim 14, wherein, when a mobile station transmits a communication signal at a maximum transmitting power and a base station receives the communication signal at a minimum receiving signal-strength based on a pre-determined threshold value, the mobile station is determined to be situated at the outermost concentric zone of radio coverage of said base station.

16. The mobile communication system of claim 13, wherein when a number of mobile stations situated inside said concentric zones of radio coverage, each of which is assigned a time divided communication signal having a time slot corresponding to a concentric zone, has exceeded a predetermined maximum number, an additional mobile station moving with said concentric zones is assigned a time divided communication signal having a new time slot that is not corresponding to the concentric zones and that is not a previously assigned time slot.

17. The mobile communication system of claim 13, wherein a mobile station, situated inside the concentric zones of radio coverage, which mobile station is assigned a time divided communication signal having a time slot corresponding to one of the concentric zones, adjusts its transmitting power so that the communication signal is able to be received at said base station within the level of receiving power based on a pre-determined minimum receiving intensity, and wherein the base station adjusts its transmitting power so that the communication signal is able to be received at a mobile station within the level of receiving power based on a pre-determined minimum receiving intensity.

18. A mobile communication method for radio communication among a plurality of communication stations including a plurality of mobile stations and at least one base station, wherein mobile communication is performed between the stations with a communication signal using a predetermined access method selected from a plurality of frequency sharing or time sharing multiple access methods available to said communication system, the method comprising steps of:

receiving a communication signal including
 a TDMA signal identified by a synchronization word code, said TDMA signal transmitted between two stations having a different synchronization word code from other TDMA signals assigned to the same frequency and time slot, based on a TDMA method, and
 a time divided CDMA signal, frequency spread by a spread code and being assigned to a time division time slot, based on a CDMA method;

regenerating one of the time divided CDMA signal and the TDMA signal from the receive communication signal and for outputting the regenerated signal as a shared signal;

removing the shared signal from the communication signal; and regenerating the other of the TDMA signal and the time divided CDMA signal as a desired signal after removal of the shared signal from the communication signal and for outputting the desired signal.

* * * * *